United States Patent
Lee et al.

(10) Patent No.: US 12,431,762 B2
(45) Date of Patent: Sep. 30, 2025

(54) ROBOT WHEEL DRIVING APPARATUS

(71) Applicant: LG ELECTRONICS INC., Seoul (KR)

(72) Inventors: Jangwon Lee, Seoul (KR); Myungkeun Yoo, Seoul (KR); Changhum Jo, Seoul (KR)

(73) Assignee: LG Electronics Inc., Seoul (KR)

( * ) Notice: Subject to any disclaimer, the term of this patent is extended or adjusted under 35 U.S.C. 154(b) by 218 days.

(21) Appl. No.: 18/238,828

(22) Filed: Aug. 28, 2023

(65) Prior Publication Data

US 2024/0136889 A1 Apr. 25, 2024
US 2024/0235324 A9 Jul. 11, 2024

(30) Foreign Application Priority Data

Oct. 24, 2022 (KR) .................. 10-2022-0137756

(51) Int. Cl.
| | |
|---|---|
| *H02K 7/14* | (2006.01) |
| *B60K 7/00* | (2006.01) |
| *H02K 9/06* | (2006.01) |
| *H02K 9/22* | (2006.01) |

(52) U.S. Cl.
CPC ............. *H02K 7/14* (2013.01); *B60K 7/0007* (2013.01); *H02K 9/06* (2013.01); *H02K 9/227* (2021.01); *H02K 2211/03* (2013.01)

(58) Field of Classification Search
CPC .... B60K 2007/0038; B60K 2007/0092; B60K 7/0007; H02K 21/22; H02K 2211/03; H02K 5/18; H02K 7/14; H02K 9/06; H02K 9/14; H02K 9/227
See application file for complete search history.

(56) References Cited

U.S. PATENT DOCUMENTS

2004/0080223 A1* 4/2004 Shimizu ............... B60K 17/046
310/75 C
2017/0070107 A1* 3/2017 Lee ...................... H02K 1/2791

FOREIGN PATENT DOCUMENTS

| KR | 20140037356 | 3/2014 |
| KR | 10-2014-0044495 A | 4/2014 |
| KR | 10-1517075 B1 | 5/2015 |
| KR | 101918667 | 11/2018 |
| KR | 101918667 B1 * | 11/2018 |
| KR | 10-2234440 B1 | 3/2021 |
| KR | 10-2279737 B1 | 7/2021 |
| KR | 102359350 | 2/2022 |
| KR | 20220055145 | 5/2022 |

OTHER PUBLICATIONS

KR-101918667-B1, all pages (Year: 2018).*

* cited by examiner

*Primary Examiner* — Naishadh N Desai
(74) *Attorney, Agent, or Firm* — Fish & Richardson P.C.

(57) ABSTRACT

A robot wheel driving apparatus includes a wheel to which a tire is coupled and configured to drive a robot, a wheel cover covering and coupled to both sides of the wheel, a motor housing inserted into the wheel, and a motor embedded in the motor housing and configured to provide a rotating force to the wheel. The wheel cover includes a wheel cover hole configured to allow air to flow from an outside of the wheel cover toward the wheel, and the wheel includes a wheel hole configured to allow air flowing into the wheel through the wheel cover hole to flow toward the motor housing, and a blade configured to allow air to flow between the wheel and the motor housing by rotation of the wheel.

20 Claims, 21 Drawing Sheets

10 : (11, 12)

ROBOT WHEEL DRIVING APPARATUS

CROSS-REFERENCE TO RELATED APPLICATION

This application claims priority to and the benefit of Korean Patent Application No. 10-2022-0137756, filed on Oct. 24, 2022, the disclosure of which is incorporated herein by reference in its entirety.

BACKGROUND

1. Technical Field

Embodiments of the present disclosure relate to a robot wheel driving apparatus, and more specifically, to a robot wheel driving apparatus, in which heat-dissipation performance of the robot wheel driving apparatus formed in a structure sealed from the outside is improved, thereby suppressing an increase in a temperature of a coil and increasing a rated torque of a motor.

2. Description of the Related Art

Contents to be described below are only described for the purpose of providing background information related to embodiments of the present disclosure, and it goes without saying that the described contents do not constitute the related art.

Robots are mechanical devices capable of recognizing an external environment by itself and autonomously operating by determining situations. Depending on the purpose, robots may be classified into industrial robots and service robots.

Until now, the focus has been on the purpose of mechanical utilization rather than a direction of approaching human intelligence, and the robot has been mainly used for factory automation such as doing simple repetitive tasks that are difficult for humans to do.

In recent years, with the rapid development of an artificial intelligence technology and increases in levels of Internet of Things (IoT), sensors, and cloud technologies, robots with intelligence different from before have been appearing.

Home robots may not only help with daily activities at home while interacting with people and provide entertainment, but also perform various roles such as improving fire, noise, and risk factors.

Meanwhile, various types of devices required for these robots to move are being developed, and representatively, the technology development for a driving apparatus such as a robot wheel motor is being conducted.

For example, robot wheel driving apparatuses may be connected to a leg of a robot and may each use a motor to rotate a wheel equipped with a tire at a set speed. In addition, an inverter motor may be used as the motor used in the robot wheel driving apparatus.

The inverter motor has an advantage in that a rotation speed of the motor can be freely adjusted through a power supplied to the motor, unnecessary energy consumption and noise can be significantly reduced, and delicate operations can be implemented.

By the way, the robot wheel driving apparatus may be manufactured to be used in various places including indoors and outdoors. Therefore, the motor used in the robot wheel driving apparatus has a sealed structure surrounded by a wheel and a wheel cover in order to prevent foreign substances from flowing into the motor.

Therefore, the robot wheel driving apparatus has a disadvantage in that it is difficult to dissipate heat generated in the motor due to the sealed structure.

Conventionally, in order to improve the heat-dissipation performance of the motor having the structure sealed by the wheel and the wheel cover, several methods of applying a separate fan to an inside of the motor or suctioning and discharging air to and from the inside of the motor have been introduced.

However, in the sealed structure in which the wheel and the wheel cover entirely surround the motor, it is difficult to suppress an increase in a temperature of the motor because outside air may not flow into the motor.

In particular, the priority of an inverter-integrated motor used in the robot wheel driving apparatus is a high power characteristic. Therefore, a high current is applied to the robot wheel driving apparatus when the motor operates for a high torque. As a result, there is a problem that a large amount of copper loss occurs in the motor of the robot wheel driving apparatus, resulting in a steep increase in a temperature of a coil.

Generally, heat generated from the coil of the motor is transmitted to a stator frame and a motor housing through a stator core.

Therefore, in order to prevent the increase in the temperature of the coil, it is important to allow a large amount of outside air to flow through the motor housing and the stator frame to well perform heat exchange.

However, since the robot wheel driving apparatus has the sealed structure in which the wheel and the wheel cover surround the motor, it is difficult to improve heat-dissipation performance by allowing outside air to flow into the motor housing and the stator core or allowing air to flow through the motor housing and the stator core.

When the motor is sealed by the wheel, the wheel cover, and the like, a temperature of the air surrounding the motor increases together with the temperature of the motor.

Therefore, in the robot wheel driving apparatus, it is necessary to smoothly circulate the air for the heat dissipation of the motor by allowing the outside air to pass through the wheel and the wheel cover to flow into the wheel and allowing the introduced outside air to flow around the motor housing.

As the related art document related to the present disclosure, Korean Patent Application Laid-Open No. 10-2022-0055145 (hereinafter referred to as "Patent Document 1") discloses an air cooling type in-wheel motor apparatus.

The in-wheel motor disclosed in Patent Document 1 includes a housing, a first cover coupled to one side of the housing, a second cover coupled to the other side of the housing, and a motor assembly embedded in the housing and including a stator and a rotor.

In particular, in Patent Document 1, a hole is formed in each of the first cover and the second cover coupled to both sides of the housing. In addition, it is characterized in that a part of the motor assembly is exposed to the outside through the holes.

In Patent Document 1, a motor is cooled by an air cooling method without using a separate cooling device.

However, Patent Document 1 discloses a structure in which a plurality of pipes connected to the holes formed in each of the first cover and the second cover and forming an air flow path are installed inside the motor assembly. In particular, the plurality of pipes have a complicated structure and are installed to pass through the motor assembly through a stator hub. In addition, in order to insert and install a separate pipe inside the motor assembly, it is difficult to process and assemble components such as the stator hub.

As another related art document related to the present disclosure, Korean Patent Application Laid-Open No. 10-2014-0037356 (hereinafter referred to as "Patent Document 2") discloses a cooling system of an in-wheel motor.

The in-wheel motor cooling system disclosed in Patent Document 2 allows air to flow toward an in-wheel motor by adding a blowing unit having a rotation wing inside a wheel.

However, in Patent Document 2, there is a disadvantage in that, by arranging the blowing unit having the separate rotation wing inside the wheel, specifically, between a hub and an in-wheel motor, the overall size of the in-wheel motor is increased by a size of the blowing unit, leading to a result against the trend of miniaturization and light-weight of the motor.

In addition, in Patent Document 2, there is a disadvantage in that since the separate blowing unit is not formed with a structure integrated with the wheel as the blowing unit is bolt-fastened inside the wheel, a fastening structure may be weakened or noise, vibrations, or the like may be generated during long-term use.

In addition, the in-wheel motor disclosed in Patent Document 2 does not have a sealed structure in which the wheel and a wheel cover surround the motor, and it is difficult to apply the in-wheel motor to an inverter-integrated motor in which a motor housing is inserted into the wheel and a stator frame is coupled to one open surface of the motor housing.

As still another related art document related to the present disclosure, Korean Patent No. 10-2359350 (hereinafter referred to as Patent Document 3) discloses a sealed type in-wheel motor having a cooling structure.

In the sealed in-wheel motor disclosed in Patent Document 3, a first cover member and a second cover member are coupled to both sides of the wheel. A fixed shaft is disposed to pass through the centers of the first cover member and the second cover member, and the first cover member and the second cover member rotate about the fixed shaft. A cooling fan, that is, a blade, is formed inside each of the first cover member and the second cover member. In addition, a suction part through which air is introduced and a discharge part through which the air is discharged are formed on the fixed shaft.

However, Patent Document 3 discloses a technology applicable to an in-wheel motor structure in which the first cover member and the second cover member coupled to both sides of the wheel necessarily rotate about the fixed shaft. That is, a motor in which the first cover member and the second cover member do not rotate has a problem that the blade does not rotate. In addition, as a fan-shaped blade is formed inside each of the first cover member and the second cover member, there is a disadvantage in that the overall size of the motor increases and a weight thereof increases.

In addition, in Patent Document 3, the suction part and the discharge part through which the outside air is introduced to and discharged from the inside of the motor are formed to pass through the fixed shaft. Therefore, it is difficult to form an air flow path inside the shaft in a structure of a motor having a shaft having a relatively small diameter. In addition, forming the air flow path inside the shaft may cause a problem of hindering structural stiffness and allowing external foreign substances to flow into the motor from a surface of the shaft to cause a failure of the motor.

RELATED ART DOCUMENTS

Patent Documents (Patent Document 1) Korean Patent Application Laid-Open No. 10-2022-0055145

(Patent Document 2) Korean Patent Application Laid-Open No. 10-2014-0037356)

(Patent Document 3) Korean Patent No. 10-2359350

SUMMARY

The present disclosure is directed to providing a robot wheel driving apparatus, in which heat-dissipation performance of a motor in the robot wheel driving apparatus having a structure in which the motor embedded in a wheel is sealed from the outside is improved by the wheel and a wheel cover, thereby suppressing an increase in a temperature of a coil and increasing a rated torque of the motor.

The present disclosure is also directed to providing a robot wheel driving apparatus, which may seek miniaturization and light-weight of an inverter-integrated motor and enable the circulation of outside air toward the inverter-integrated motor of which an entire surface is sealed by a wheel and a wheel cover, thereby suppressing an increase in a temperature of a coil and increasing a rated torque of the motor.

The present disclosure is also directed to providing a robot wheel driving apparatus, which may allow outside air introduced through a wheel cover hole to flow into a motor housing through a wheel hole and allow the air to flow within an air gap between a wheel and the motor housing by rotation of a blade formed on the wheel, thereby suppressing an increase in a temperature of a coil and increasing a rated torque of a motor without increasing a size of the motor.

The present disclosure is also directed to providing a robot wheel driving apparatus, in which a heat-radiation surface area is increased using heat-radiation fins of a motor housing facing a blade formed on a wheel and protruding toward the wheel and heat exchange is promoted through connection between the motor housing, a stator frame, and a link, thereby suppressing an increase in a temperature of a coil.

Objects of the present disclosure are not limited to the above-described objects, and other objects and advantages of the present disclosure that are not mentioned can be understood by the following description and more clearly understood by embodiments of the present disclosure. In addition, it will be able to be easily seen that the objects and advantages of the present disclosure may be achieved by devices and combinations thereof that are described in the claims.

According to one aspect of the present disclosure, there is provided a robot wheel driving apparatus, in which heat-dissipation performance of the robot wheel driving apparatus formed in a structure sealed from the outside is improved, thereby suppressing an increase in a temperature of a coil and increasing a rated torque of a motor.

The robot wheel driving apparatus according to the embodiment of the present disclosure includes a wheel, a wheel cover, a motor housing, and a motor.

The wheel may have a circular body configured to rotate to drive a robot.

A tire may be coupled to an outer ring of the wheel.

The wheel cover may be connected by covering both sides of the wheel.

The motor housing may be inserted into the wheel. The motor housing may have a cylindrical shape with one open surface in order to mount a rotor and a stator constituting the motor therein.

The motor is embedded in the motor housing and provides a rotating force to the wheel. Here, the motor may be an inverter-integrated motor.

The wheel cover may include wheel cover holes. The wheel may include a wheel hole and a blade.

The wheel hole may allow air to flow from an outside of the wheel cover toward the wheel.

The wheel hole may allow air flowing into the wheel through the wheel cover hole to flow toward the motor housing.

The blade may protrude from the inner side of the wheel toward the motor housing.

The blade may be rotated by rotation of the wheel and may allow air to forcibly flow into a gap between the wheel and the motor housing.

The wheel cover may include a first wheel cover portion and a second wheel cover portion.

The first wheel cover portion may cover and be coupled to one side of the wheel.

The second wheel cover portion may be disposed to face the first wheel cover portion with the wheel interposed therebetween and cover and be coupled to the other side of the wheel.

In this case, the wheel cover holes passing through each of the first wheel cover portion and the second wheel cover portion may be formed to be symmetrical to each other. Therefore, it is possible to allow the air to be more smoothly introduced and flow through both sides of the wheel with the wheel interposed therebetween.

The first wheel cover portion may include a first cover body and a first connector.

The first cover body may have a shape that convexly covers the one side of the wheel to secure a first internal space having a predetermined size between the one side of the wheel and the first cover body.

The first connector may extend from an upper end of the first cover body in a height direction and connect the first cover body to a leg connector.

In this case, the wheel cover hole may be formed in the first cover body.

A plurality of wheel cover holes may be formed radially with respect to the center of the motor in the first cover body.

For example, the wheel cover hole may include a first wheel cover hole, a second wheel cover hole, and a third wheel cover hole. The first wheel cover hole may be a plurality of holes disposed to be spaced apart from each other in a circumferential direction of a circle having a first radius with respect to the center of the motor in the first cover body. The second wheel cover hole may be provided as a plurality of holes disposed to be spaced apart from each other in a circumferential direction along a circle having a second radius greater than the first radius with respect to the center of the motor in the first cover body. The third wheel cover hole may be provided as a plurality of holes disposed to be spaced apart from each other in a circumferential direction along a circle having a third radius greater than the second radius with respect to the center of the motor in the first cover body.

The second wheel cover portion may include a second cover body and a second connector.

The second cover body may have a shape that convexly covers the other side of the wheel to secure a second internal space having a predetermined size between the other side of the wheel and the second cover body. The second connector may extend from an upper end of the second cover body in a height direction and connect the second cover body with the leg connector.

In this case, the wheel cover hole may be formed in the second cover body.

A plurality of wheel cover holes may be formed radially with respect to the center of the motor in the second cover body.

For example, the wheel cover hole may include a first wheel cover hole, a second wheel cover hole, and a third wheel cover hole. The first wheel cover hole may be provided as a plurality of holes disposed to be spaced apart from each other in a circumferential direction along a circle having a first radius with respect to the center of the motor in the second cover body. The second wheel cover hole may be provided as a plurality of holes disposed to be spaced apart from each other in a circumferential direction along a circle having a second radius greater than the first radius with respect to the center of the motor in the second cover body. The third wheel cover hole may be provided as a plurality of holes disposed to be spaced apart from each other in a circumferential direction along a circle having a third radius greater than the second radius with respect to the center of the motor in the second cover body.

Here, when the wheel cover hole may be formed in the wheel cover, the size and arrangement thereof do not hinder the beauty of an exterior, and the wheel cover hole may have a shape that does not affect a user's safety and structural reliability.

For example, the first wheel cover holes may be disposed to be spaced apart from each other in a circumferential direction along a circle having a radius of 20 mm with respect to the center of the motor. That is, the first wheel cover hole may have a pitch circle diameter (PCD) of 20 mm. Each of the first wheel cover holes may have a diameter of 3 mm. In addition, nine first wheel cover holes may be formed.

For example, the second wheel cover holes may be disposed to be spaced apart from each other in a circumferential direction along a circle having a radius of 40 mm with respect to the center of the motor. That is, the second wheel cover hole may have a PCD of 40 mm. Each of the second wheel cover holes may have a diameter of 3 mm. In addition, sixteen second wheel cover holes may be formed.

For example, the third wheel cover holes may be disposed to be spaced apart from each other in a circumferential direction along a circle having a radius of 60 mm with respect to the center of the motor. That is, the third wheel cover hole may have a PCD of 60 mm. Each of the third wheel cover holes may have a diameter of 3 mm. In addition, twenty third wheel cover holes may be formed.

As described above, the first wheel cover hole, the second wheel cover hole, and the third wheel cover hole may be circular holes having the same diameter (e.g., 3 mm).

In addition, the first wheel cover hole, the second wheel cover hole, and the third wheel cover hole may be formed to be symmetrical to all components of the wheel covers disposed at both sides of the wheel, that is, both the first wheel cover portion and the second wheel cover portion. Therefore, in a sealed structure, it is possible to allow air to be introduced and flow in an arbitrary direction from both sides with the wheel interposed therebetween, thereby improving heat-dissipation performance.

The wheel may include a first wheel body portion and a second wheel body portion. The first wheel body portion may have a disk shape. The second wheel body portion may protrude along an edge of the first wheel body portion in a circular tube shape, and a tire may be mounted on an outer circumferential surface of the second wheel body portion.

In this case, the wheel hole may be formed in the first cover body portion.

For example, the wheel hole may be positioned at a middle point in the radial direction between the center of the motor and the tire in the first wheel body portion. Therefore, the wheel hole may allow as much outside air as possible to be introduced, and improve structural reliability of the wheel.

The wheel hole may be provided as a plurality of wheel holes. The plurality of wheel holes may be disposed to be spaced apart from each other in a circumferential direction along a circle having a set radius with respect to the center of the motor in the first wheel body portion. Each of the plurality of wheel holes may be a circular hole having the same diameter.

As described above, the wheel hole may be formed in the disc-shaped first wheel body portion disposed to face the wheel cover. As an example, six wheel holes may be disposed in a circumferential direction along a circle having a radius of 60 mm with respect to the center of the motor.

In this case, each of the wheel holes may be a circular hole having a diameter of at least 10 times a diameter of the first wheel cover hole (or the second wheel cover hole or the third wheel cover hole) included in the wheel cover hole. For example, when the diameter of the first wheel cover hole (or the second wheel cover hole or the third wheel cover hole) is 3 mm, the diameter of the wheel hole may be 30 mm.

The blade may be formed on an inner circumferential surface of the second wheel body portion.

The blade may be provided as a plurality of blades. The plurality of blades may be disposed to be spaced apart from each other in a circumferential direction along the inner circumferential surface of the second wheel body portion, and each of the blades may protrude from the inner circumferential surface of the second wheel body portion in the radial direction of the motor. In this case, a protrusion length of each of the plurality of blades may be formed shorter than a distance between the second wheel body portion and the motor housing.

As described above, the plurality of blades may be disposed to be spaced apart from each other in a circumferential direction along the inner circumferential surface of the wheel, that is, the inner circumferential surface of the second wheel body portion and disposed in a straight wing shape. When the wheel rotates, the plurality of blades may rotate with the wheel, and air flow may be generated in a gap space between the wheel and the motor housing according to the rotation of the blade. Therefore, the air introduced through the wheel cover hole may flow into the wheel through the wheel hole, and air flow may be generated in the gap space between the wheel and the motor housing according to the rotation operations of the plurality of blades. As a result, it is possible to improve the heat-dissipation performance of the motor housing and prevent an increase in a temperature of a coil.

In addition, the blade may be formed on the inner circumferential surface of the second wheel body portion. The motor housing includes a disk-shaped first motor housing portion disposed to face the first wheel body portion, and a circular tube-shaped second motor housing portion disposed to face the second wheel body portion with an air gap interposed therebetween. In this case, a heat-radiation fin configured to increase a heat-radiation surface area of the second motor housing portion may be provided on the outer circumferential surface of the second motor housing portion.

In addition, a gap having a set size may be formed between the blade and the heat-radiation fin.

The air introduced through the wheel cover hole may flow into the wheel through the wheel hole, and air flow may be generated between the wheel and the motor housing according to the rotation operation of the plurality of blades. In this case, since the heat-radiation fin is further provided in the motor housing, it is possible to increase the heat-radiation surface area of the motor housing. Therefore, since the heat-radiation fin is applied to both the motor housing and the blade provided on the wheel, it is possible to further improve the heat-dissipation performance of the motor housing by the air flow and effectively prevent the increase in the temperature of the coil.

For example, the blade may be provided as a plurality of blades. The plurality of blades may be disposed to be spaced apart from each other in the circumferential direction along the inner circumferential surface of the second wheel body portion. Each of the plurality of blades may protrude from the inner circumferential surface of the second wheel body portion in a radial direction of the motor.

In addition, the heat-radiation fin may be provided as a plurality of heat-radiation fins. The plurality of heat-radiation fins may be disposed to be spaced apart from each other in the circumferential direction along the outer circumferential surface of the second motor housing portion. Each of the plurality of heat-radiation fins may protrude from the outer circumferential surface of the second motor housing portion toward each of the plurality of blades. A protrusion length of each of the plurality of blades may be formed to be the same as a protrusion length of each of the plurality of heat-radiation fins.

The robot wheel driving apparatus according to one embodiment of the present disclosure may further include a link.

The link may be embedded in the wheel cover. The link may connect the motor to the wheel cover to constrain a position of the motor. For example, one end of the link may be fixed to the wheel cover, and the other end of the link may be fixed to the motor.

The robot wheel driving apparatus according to one embodiment of the present disclosure may further include a lower cover.

The lower cover may be coupled to a lower portion of the wheel cover. The lower cover may cover an open portion between the tire and the wheel cover when the wheel and the wheel cover are connected.

A fastening groove may be provided in the tire. Correspondingly, a fastening protrusion inserted into the fastening groove may be provided on the wheel.

The fastening protrusion includes a first fastening protrusion and a second fastening protrusion. The first fastening protrusion is a band-shaped protrusion surrounding the wheel in a circumferential direction. A plurality of second fastening protrusions may protrude in a direction intersecting the first fastening protrusion and may be formed to be spaced a predetermined distance from each other.

A through hole having a predetermined diameter and formed to pass through the first motor housing portion in a thickness direction is provided at the center of the first motor housing portion. The through hole is used as a portion into which a rear end of a rotational shaft (specifically, a second rotational shaft portion) of a rotor frame is inserted. The rotational shaft of the rotor frame may be inserted through the through hole and then connected to a fastening hole of the wheel, and as a bolt sequentially fastens the fastening hole of the wheel and a fastening groove of the rotational shaft, the rotational shaft of the rotor frame and the center of the wheel may be firmly connected.

The inverter cover may have a shape that covers the one open surface of the motor housing. The inverter cover may be connected to the motor in an integrated structure.

A capacitor may be disposed on one surface of a printed circuit board (PCB). As the capacitor, an aluminum electrolytic capacitor may be used. For example, the aluminum electrolytic capacitor may be disposed to protrude from the inner side of the inverter cover in a direction opposite to the inverter cover (i.e., a direction toward the inside of the motor). At least a part of the aluminum electrolytic capacitor may be accommodated in an empty space inside the motor and used for an inverter direct current (DC) link.

The motor includes a stator fixed to an inner side of the motor housing, and a rotor disposed outside the stator with an air gap interposed therebetween and configured to rotate about the stator.

The stator includes a plurality of coils disposed in a circumferential direction, and a stator core in which the plurality of coils are wound and mounted.

The rotor may include a plurality of magnets disposed to face the plurality of coils in a circumferential direction, and a rotor frame configured to fix the plurality of magnets, concentrically connected to the wheel, and configured to rotate inside the motor housing.

The rotor frame may include a rotational shaft formed in a central direction of the motor.

The rotational shaft may include a first rotational shaft portion and a second rotational shaft portion. For example, the first rotational shaft portion may be supported by a first bearing. The second rotational shaft portion may have a greater diameter than the first rotational shaft portion, may be connected integrally with a rear end of the first rotational shaft portion, and may be supported by a second bearing. In addition, a wave washer may be provided at a front end of the first bearing.

The rotor frame may include the rotational shaft formed in the central direction of the motor, a disk-shaped first rotor frame portion connected to the rotational shaft, and a circular tube-shaped second rotor frame portion protruding a predetermined length from an edge of the first rotor frame portion.

The first rotor frame portion may include an outer frame, an inner frame, and an inclined frame. For example, the outer frame may be a disk-shaped frame formed at a position far from the center of the motor in a radial direction. The inner frame may be a disk-shaped frame formed at a position close to the center of the motor in the radial direction and connected (i.e., connected to have different heights) to the outer frame with a step therebetween. The inclined frame connects the outer frame to the inner frame.

A sensor magnet may be coupled to the rotational shaft. The sensor magnet may be coupled to a front end of the first rotational shaft portion. The sensor magnet may be positioned to face an encoder sensor disposed on the PCB at a set distance. Therefore, the encoder sensor disposed on the PCB may detect the number of rotations of the motor by detecting the sensor magnet coupled to the front end of the first rotational shaft portion.

A fastening groove to which a bolt may be fastened is provided at a rear end of the rotational shaft, that is, a rear end of the second rotational shaft portion. The fastening groove may be positioned at the center of the motor and connected to a fastening hole formed to pass through the center of the wheel. Therefore, the bolt may be fastened to pass through the fastening hole of the wheel and then inserted into and fastened to the fastening groove positioned at the rear end of the rotational shaft. Therefore, the wheel and the rotor frame may be concentrically coupled, and when the rotor frame rotates in the motor housing, the rotating force may be transmitted to the wheel so that the rotation of the wheel required for the robot to travel may be performed.

The stator may include a plurality of coils disposed in a circumferential direction, and a stator core on which the plurality of coils are wound and mounted, and may further include a stator frame configured to support the stator.

One surface of the stator frame may be coupled to the motor housing to cover the one open surface of the motor housing, and the other surface of the stator frame may cover and be coupled to the inverter cover. The PCB may be fastened to the stator frame and fixedly positioned inside the inverter cover.

The stator frame may include a first stator frame portion, a second stator frame portion, and a third stator frame portion. For example, the first stator frame portion may circularly protrude to face the center of the motor. The second stator frame portion may circularly protrude at a predetermined distance in the radial direction from the first stator frame portion. The third stator frame portion may radially connect the first stator frame portion to the second stator frame portion. The PCB may be fastened to the second stator frame portion.

A cylindrical groove may be formed at the center of the first stator frame portion, and a front end of the first rotational shaft portion of the rotational shaft may be inserted into and supported by the cylindrical groove. A first bearing may be inserted between the cylindrical groove and the front end of the first rotational shaft portion. The first bearing may reduce rotation friction of the first rotational shaft portion and support the first rotational shaft portion.

The second rotational shaft portion may be supported by a second bearing.

The motor housing may include a disk-shaped first motor housing portion and a circular tube-shaped second motor housing portion protruding a set length from an edge of the first motor housing portion. In this case, a through hole may be provided at the center of the first motor housing portion.

The motor housing may have a cylindrical support groove around the through hole. The support groove may be used as a region into which the second bearing is inserted. The second bearing may be constrained to the support groove and disposed between the second rotational shaft portion passing through the through hole and the motor housing. The second bearing may reduce rotation friction of the second rotational shaft portion and support the second rotational shaft portion.

The second stator frame portion may include a circular protrusion protruding toward the motor. The circular protrusion may protrude to the inside of the motor and have a structure in which an outer circumferential surface of a protruding portion and an inner circumferential surface of the stator core are in close contact with each other. Therefore, the second stator frame portion may firmly support the stator, particularly, the stator core.

The second stator frame portion may include a plurality of PCB fastening portions. The plurality of PCB fastening portions may be portions to which a plurality of bolts passing through the PCB are screw-coupled and may firmly fix the PCB.

According to another aspect of the present disclosure, there is provided a robot wheel driving apparatus that is formed in a structure sealed from the outside, thereby improving heat-dissipation performance of the robot wheel driving apparatus having an inverter-integrated motor.

The robot wheel driving apparatus according to the embodiment of the present disclosure includes a wheel, a wheel cover, a motor housing, a motor, an inverter cover, and a PCB.

The wheel may have a circular body configured to rotate to drive a robot. A tire may be coupled to an outer ring of the wheel.

The wheel cover may cover and be connected to both sides of the wheel.

The motor housing may be inserted into the wheel. The motor housing may have a cylindrical shape and have a cylindrical shape with one open surface in order to mount a rotor and a stator constituting the motor therein.

The motor may be embedded in the motor housing and provides a rotating force to the wheel. Here, the motor may be an inverter-integrated motor. The motor may include a stator fixed to an inner side of the motor housing, and a rotor disposed outside the stator with an air gap interposed therebetween and configured to rotate about the stator.

The inverter cover may be connected to the motor. For example, the stator may further include a stator frame, and the inverter cover may be coupled to the stator frame.

The PCB may be positioned inside the inverter cover to face the motor, and at least one capacitor may be disposed thereon. Here, a capacitor may be used for a DC link.

The wheel cover may include a wheel cover hole configured to allow air to flow from an outside of the wheel cover toward the wheel.

The wheel may include a wheel hole configured to allow air flowing into the wheel through the wheel cover hole to flow toward the motor housing.

The stator may include a plurality of coils disposed in a circumferential direction, and a stator core in which the plurality of coils are wound and mounted.

The rotor may include a plurality of magnets and a rotor frame.

The plurality of magnets may be disposed in a circumferential direction to face the plurality of coils.

The rotor frame may fix the plurality of magnets. The rotor frame may be concentrically connected to the wheel and may rotate inside the motor housing.

The rotor frame may include a rotational shaft formed in a central direction of the motor.

The rotational shaft may include a first rotational shaft portion and a second rotational shaft portion. The first rotational shaft portion may be supported by a first bearing. The second rotational shaft portion may have a greater diameter than the first rotational shaft portion. The second rotational shaft portion may be connected integrally with a rear end of the first rotational shaft portion and supported by a second bearing.

The rotor frame may include a rotational shaft, a first rotor frame portion and a second rotor frame portion.

The rotational shaft may be formed in the central direction of the motor. The first rotor frame portion may be connected to the rotational shaft and may have a disk shape. The second rotor frame portion may have a circular tube shape protruding a predetermined length from the edge of the first rotor frame portion.

The first rotor frame portion may include an outer frame, an inner frame, and an inclined frame.

The outer frame may be a disk-shaped frame formed at a position far from the center of the motor in a radial direction. The inner frame may be a disk-shaped frame formed at a position close to the center of the motor in the radial direction and connected to the outer frame with a step therebetween. The inclined frame may be a frame connecting the outer frame to the inner frame to be inclined.

The robot wheel driving apparatus according to one embodiment of the present disclosure may include a blade and a heat-radiation fin.

The blade may protrude from the inner side of the wheel toward the motor housing and allow air to flow between the wheel and the motor housing by rotation of the wheel.

The heat-radiation fin may be formed in a direction facing the blade in the motor housing and may increase a heat-radiation surface area of the motor housing.

The stator may include a stator frame configured to support the stator.

At least a part of one surface of the stator frame may be coupled in contact with the motor housing to cover the one open surface of the motor housing. The other surface of the stator frame may be coupled by being covered by the inverter cover.

The PCB may be fastened to the stator frame and fixedly positioned inside the inverter cover.

The robot wheel driving apparatus according to one embodiment of the present disclosure may further include a link.

The link may be embedded in the wheel cover and may connect the motor to the wheel cover to constrain a position of the motor. For example, the link may include a straight link portion forming one end of the link and coupled to the wheel cover, and a circular link portion forming the other end of the link and closely coupled along the edge of the stator frame. The inverter cover may be inserted into an internal hollow of the circular link portion.

The circular link portion may have a structure connected to the motor housing cooled by rotation of the blade of the wheel. According to the structure in which the stator frame is connected to the motor housing and the circular link portion is coupled to the stator frame, it is possible to promote heat exchange between the motor housing, the stator frame, and the link, which are made of a metal material. Therefore, it is possible to improve the heat-dissipation performance of the motor and prevent the increase in the temperature of the coil.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
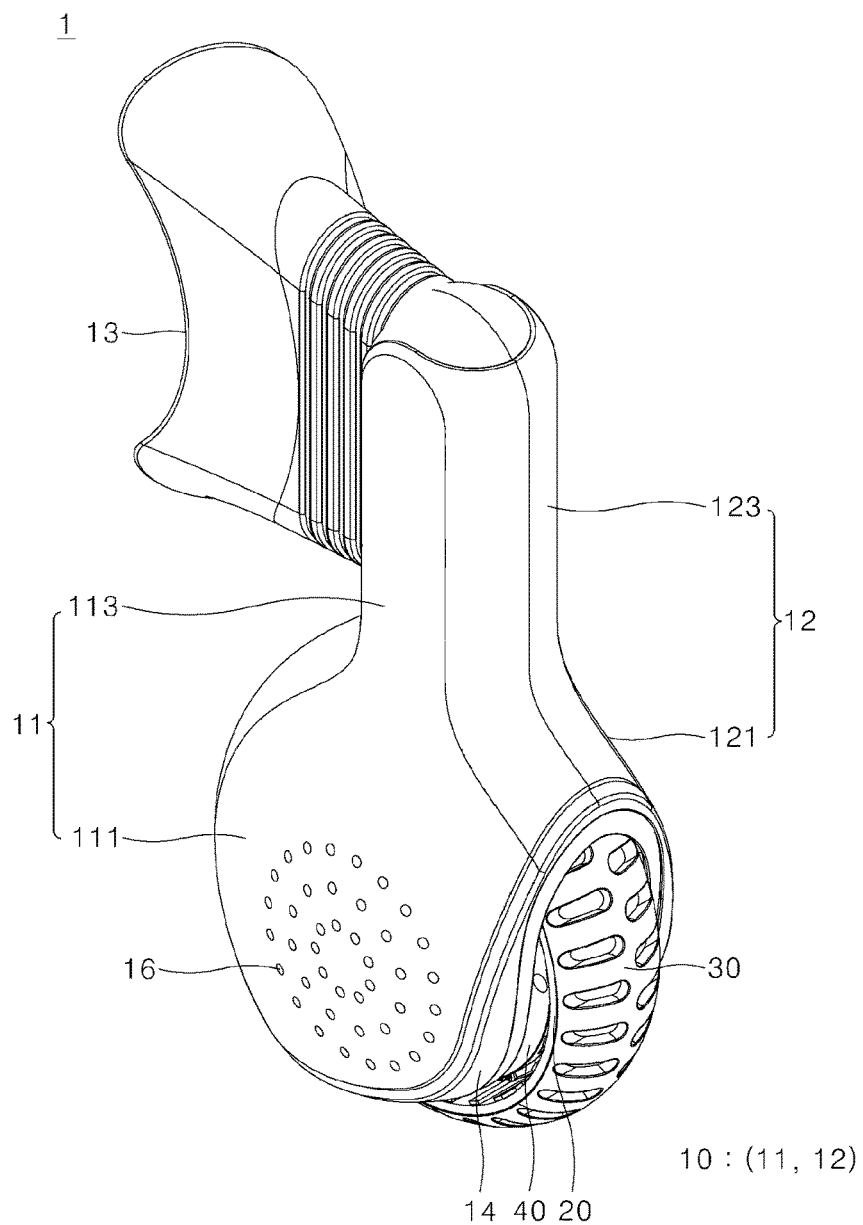
FIG. 1 is a front perspective view schematically illustrating a robot wheel driving apparatus according to one embodiment of the present disclosure.
Figure 2:
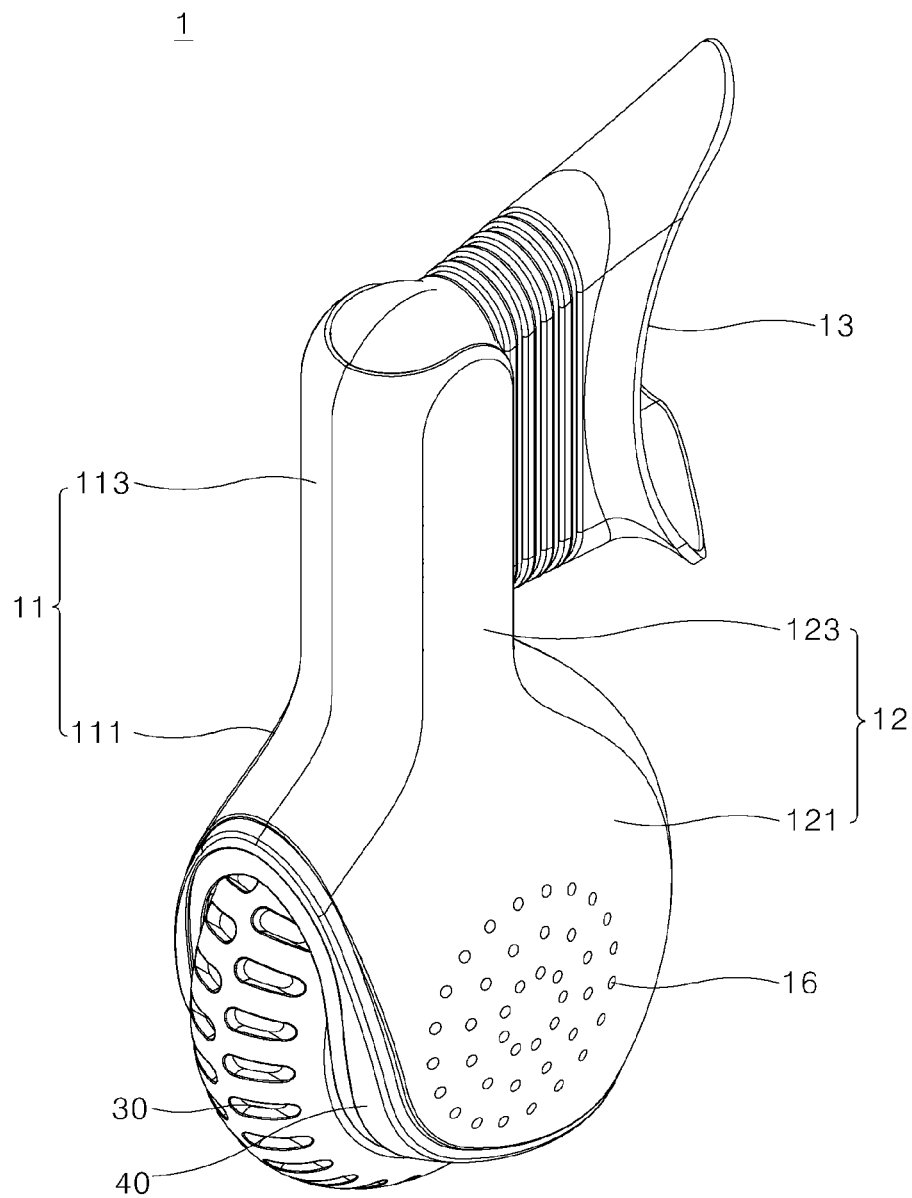
FIG. 2 is a rear perspective view schematically illustrating the robot wheel driving apparatus according to one embodiment of the present disclosure.

The above-described objects, features, and advantages will be described below in detail with reference to the accompanying drawings, and thus those skilled in the art to which the present disclosure pertains will be able to easily carry out the technical spirit of the present disclosure. In describing the present disclosure, when it is determined that a detailed description of the known technology related to the present disclosure may unnecessarily obscure the gist of the present disclosure, a detailed description thereof will be omitted. Hereinafter, exemplary embodiments according to the present disclosure will be described in detail with reference to the accompanying drawings. In the drawings, the same reference numerals are used to indicate the same or similar components.

Although the terms first, second, and the like are used to describe various components, it goes without saying that these components are not limited by these terms. These terms are only used to distinguish one component from another component, and unless otherwise stated, it goes without saying that the first component may also be the second component.

Throughout the specification, unless otherwise stated, each component may be singular or plural.

Hereinafter, the arrangement of an arbitrary component on an "upper portion (or lower portion)" of a component or "above (or under)" the component may not only mean that the arbitrary component is disposed in contact with an upper surface (or a lower surface) of the component, but also mean that other components may be interposed between the component and the arbitrary component disposed above (or under) the component.

In addition, when a certain component is described as being "connected," "coupled," or "joined" to another component, the components may be directly connected or joined, but it should be understood that other components may be "interposed" between the components, or the components may be "connected," "coupled," or "joined" through another component.

The singular expression used herein includes the plural expression unless the context clearly dictates otherwise. In the application, terms such as "composed of" or "comprising" should not be construed as necessarily including all of the various components or operations described in the specification and should be construed as not including some of the components or some of the operations or further including additional components or operations.

Throughout the specification, when "A and/or B" is described, this means A, B, or A and B unless otherwise specified, and when "C to D" is described, this means C or more and D or less unless otherwise specified.

In the following description, a robot is a robot capable of moving in forward, backward, left, and right directions by driving a wheel.

In the following description, a robot wheel driving apparatus may be connected to a leg of a robot body and uses a motor to rotate a wheel equipped with a tire at a set speed.

In the following description, the motor used in the robot wheel driving apparatus may be an inverter-integrated motor. In the inverter-integrated motor, a rotation speed of the motor can be freely adjusted through power supplied to the motor, unnecessary energy consumption and noise can be significantly reduced, and delicate operations can be implemented.

In the following description, an aluminum electrolytic capacitor may be used for a direct current (DC) link of the inverter-integrated motor. A multi-layer ceramic capacitor (MLCC) has an advantage of good high-frequency characteristics, but has a disadvantage of high risk of cracking caused by thermal deformation of a printed circuit board (PCB). In addition, the MLCC is a relatively high price, and since the MLCC has a small capacitance, there is a disadvantage of spatial restrictions in component arrangement because many MLCCs need to be disposed in parallel. Therefore, an aluminum electrolytic capacitor may be used in the present disclosure. The aluminum electrolytic capacitor has advantages of low cost and high structural reliability against thermal deformation of the PCB compared to the MLCC. In addition, since the aluminum electrolytic capacitor may be applied as a single component, there is an advantage in that there is no spatial restriction upon disposed on the PCB, and thus area efficiency of the PCB is increased.

Hereinafter, the present disclosure will be described in detail with reference to the accompanying drawings illustrating a robot wheel driving apparatus according to an embodiment of the present disclosure.

[Overall Structure of Robot Wheel Driving Apparatus]

Hereinafter, the overall structure of the robot wheel driving apparatus according to one embodiment of the present disclosure will be described in detail with reference to the accompanying drawings.

Figure 6:
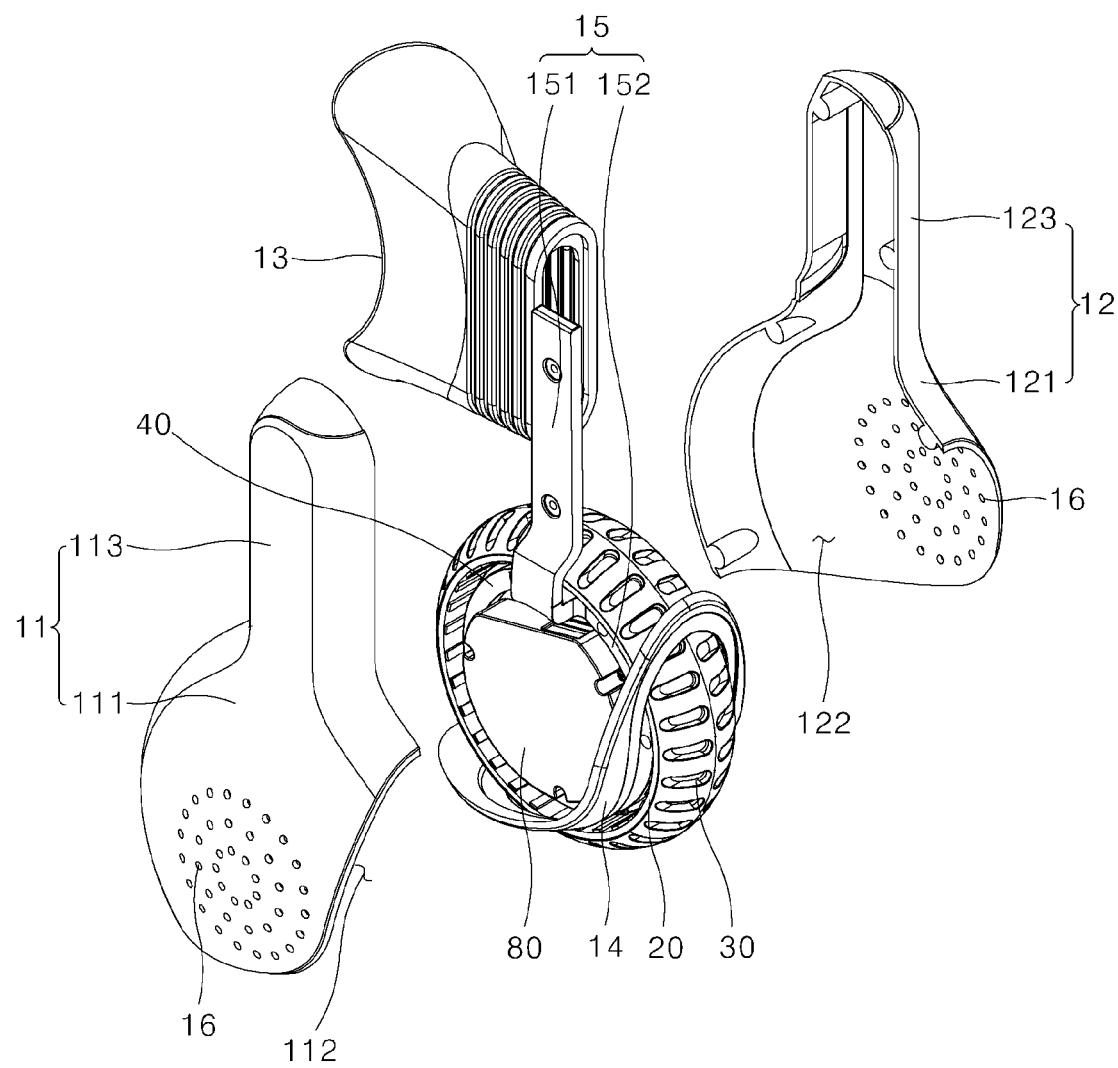
FIG. 6 is an exploded perspective view schematically illustrating the robot wheel driving apparatus according to one embodiment of the present disclosure.
Figure 7:
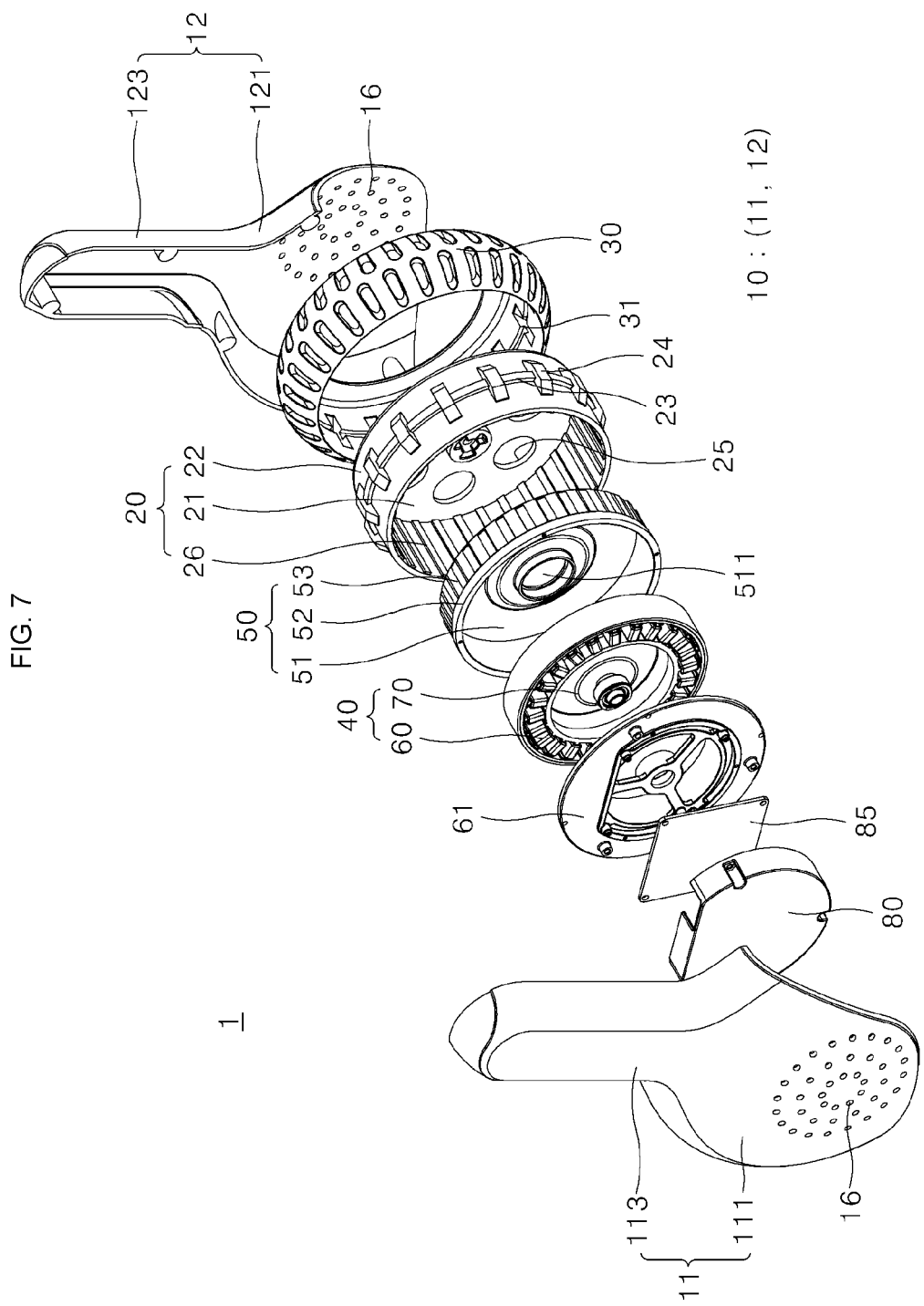
FIG. 7 is an exploded perspective view schematically illustrating a detailed configuration of the robot wheel driving apparatus according to one embodiment of the present disclosure.
Figure 8:
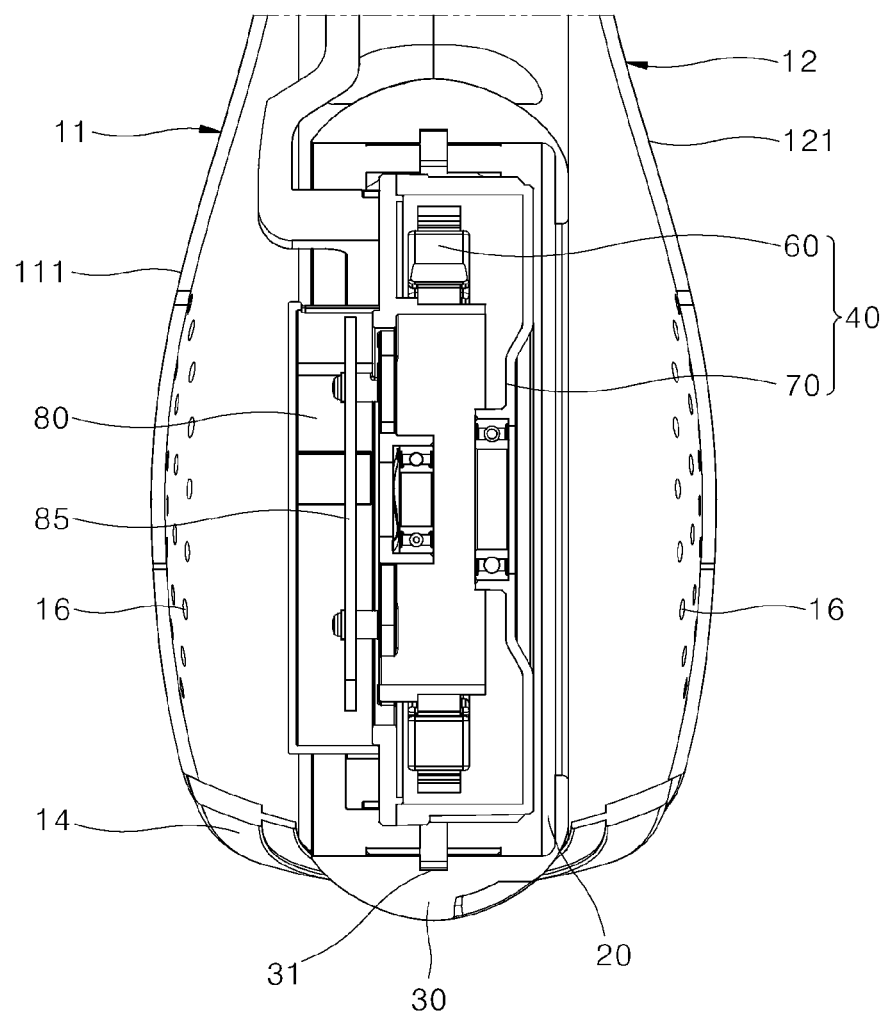
FIG. 8 is a cross-sectional view schematically illustrating the robot wheel driving apparatus according to one embodiment of the present disclosure.
Figure 9:
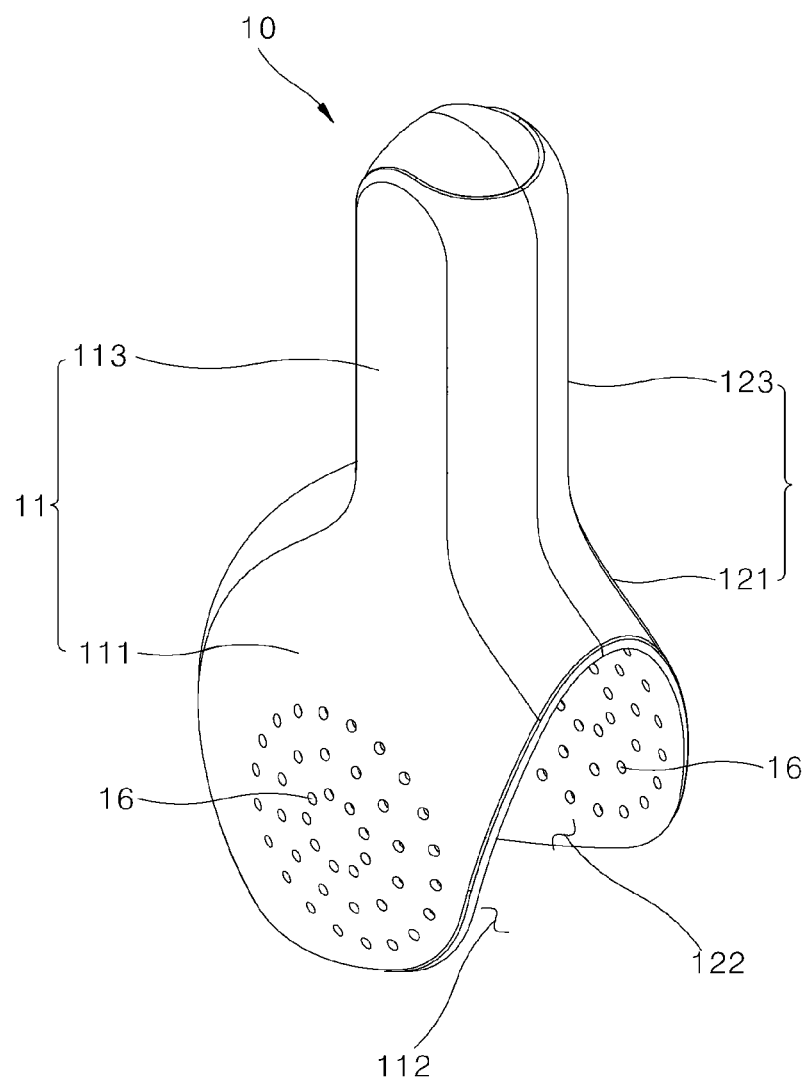
FIG. 9 is a perspective view schematically illustrating a wheel cover in the robot wheel driving apparatus according to one embodiment of the present disclosure.
Figure 10:
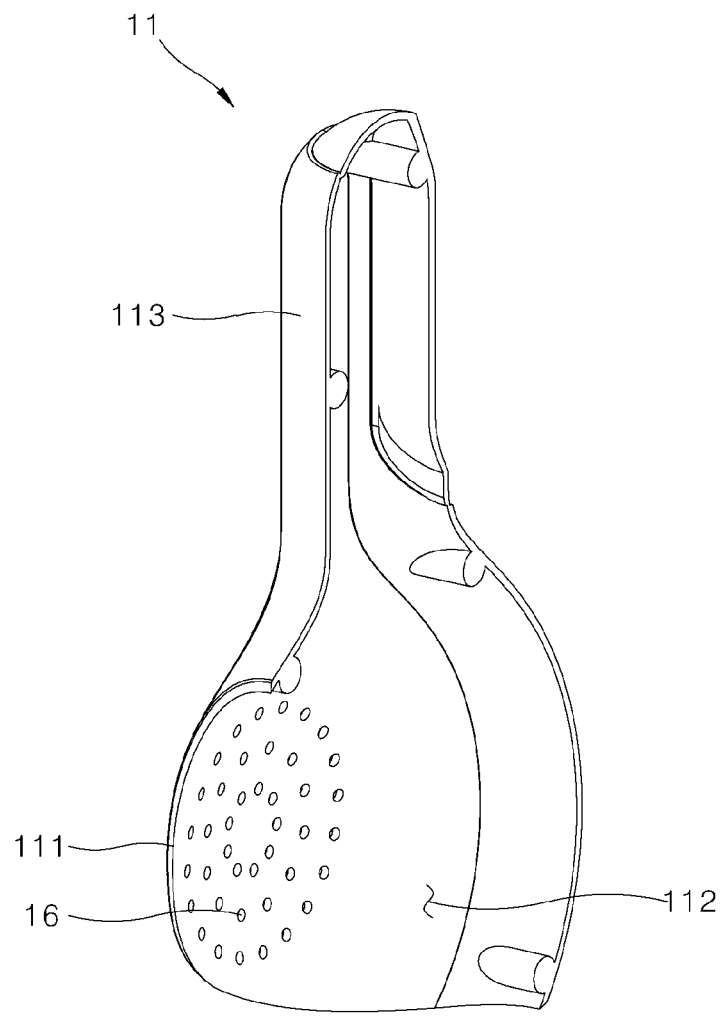
FIG. 10 is a perspective view schematically illustrating a first wheel cover portion in the robot wheel driving apparatus according to one embodiment of the present disclosure.
Figure 11:
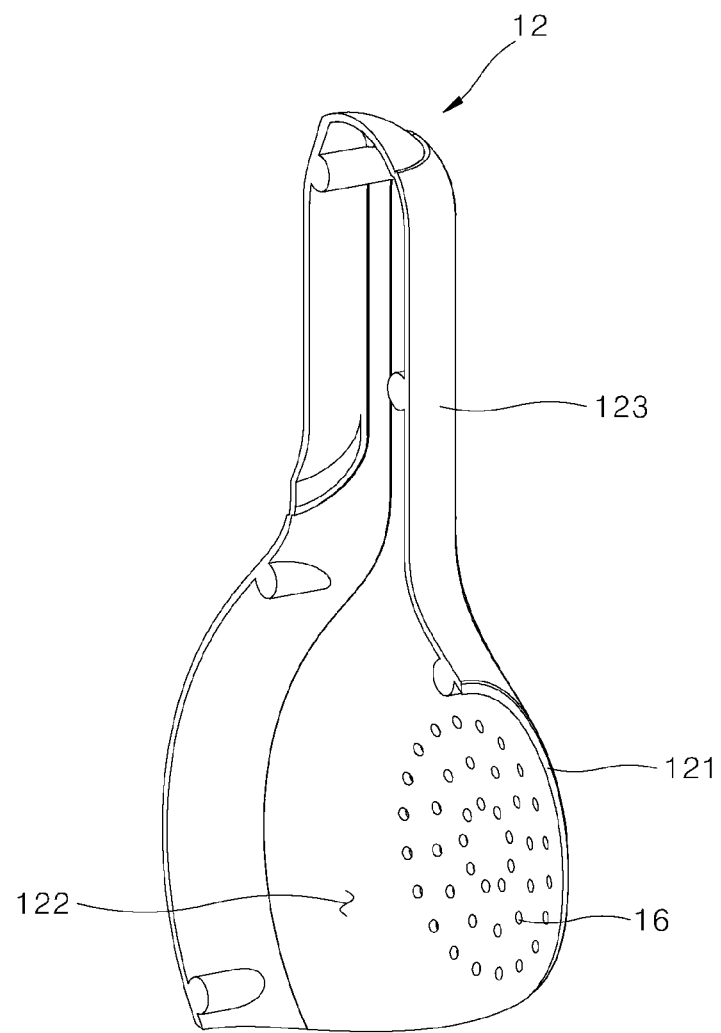
FIG. 11 is a perspective view schematically illustrating a second wheel cover portion in the robot wheel driving apparatus according to one embodiment of the present disclosure.
Figure 12:
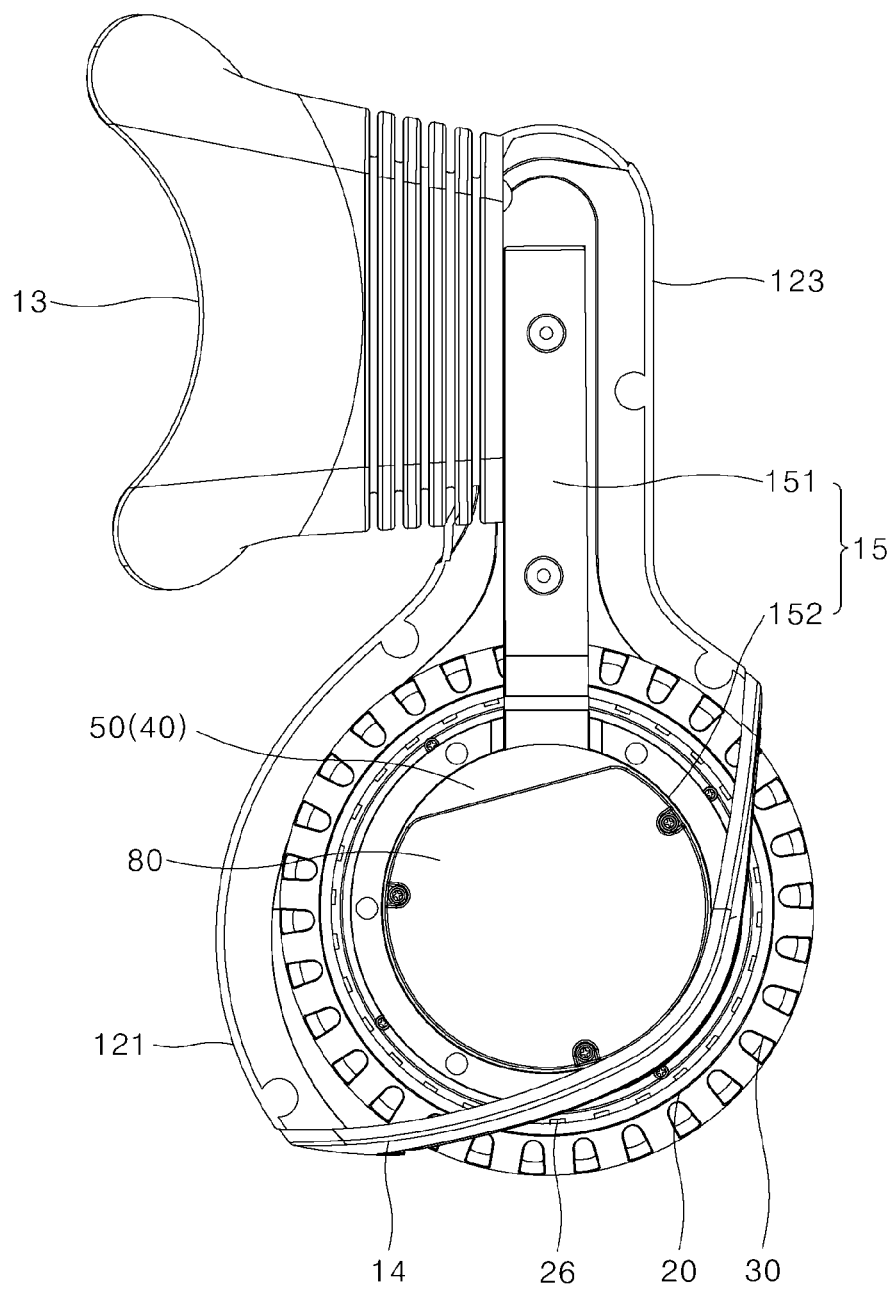
FIG. 12 is a left side view illustrating a left internal structure in which the first wheel cover portion is removed from the robot wheel driving apparatus according to one embodiment of the present disclosure.
Figure 13:
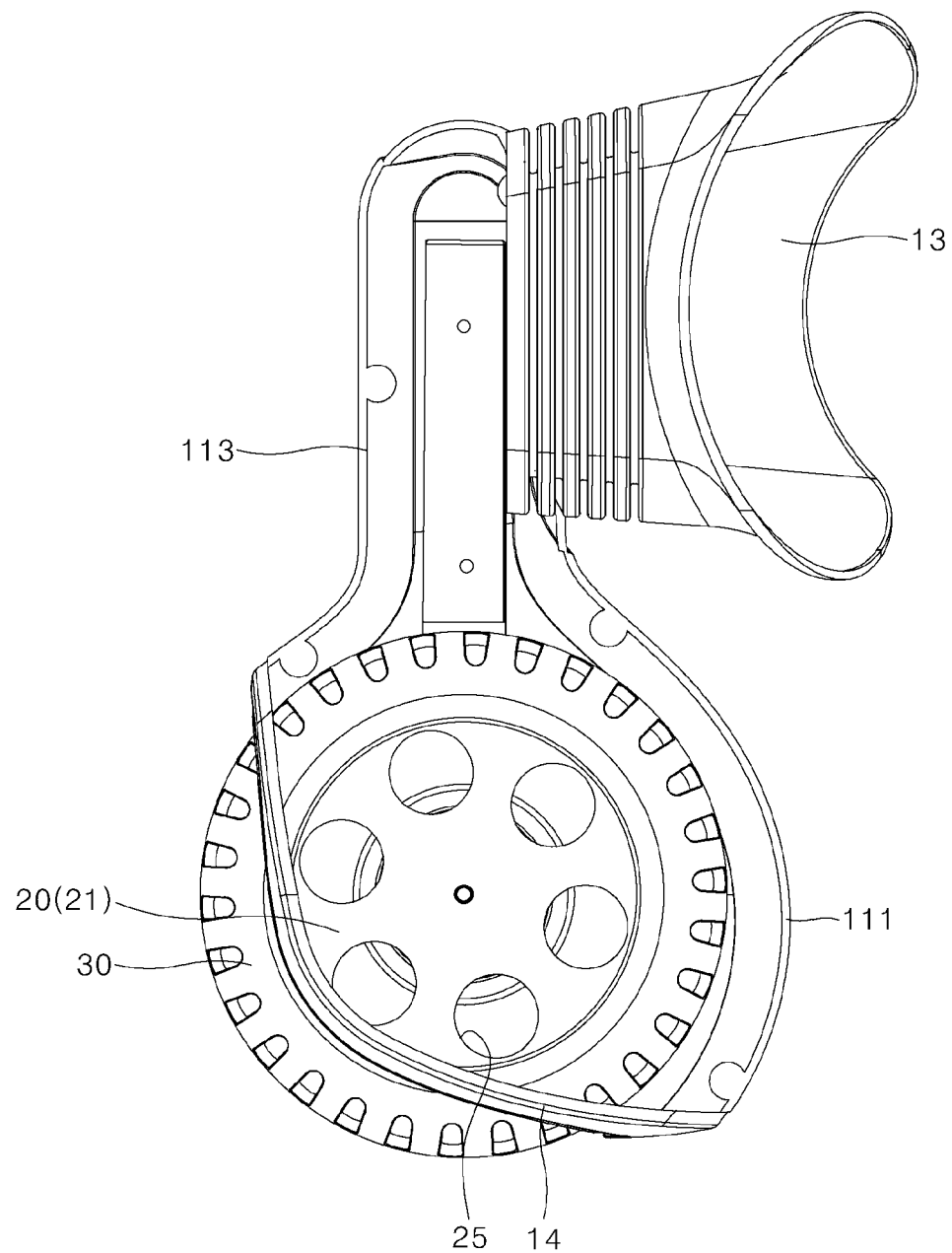
FIG. 13 is a right side view illustrating a right internal structure in which the second wheel cover portion is removed from the robot wheel driving apparatus according to one embodiment of the present disclosure.
Figure 14:
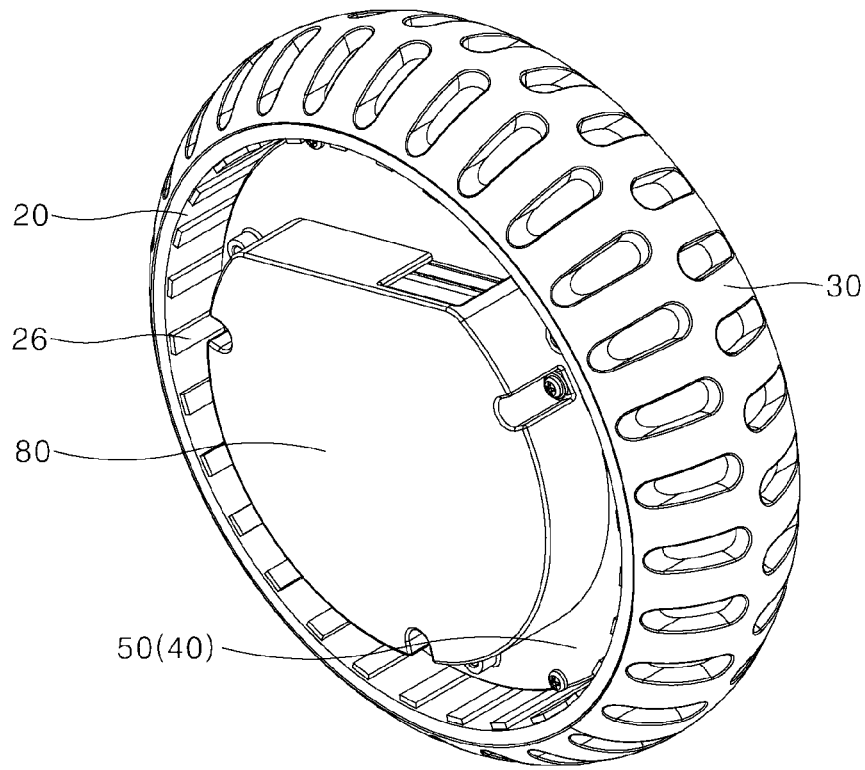
FIG. 14 is a perspective view illustrating a detailed configuration of a tire, a wheel, and a motor in a structure in which the wheel cover is removed from the robot wheel driving apparatus according to one embodiment of the present disclosure.
Figure 15:
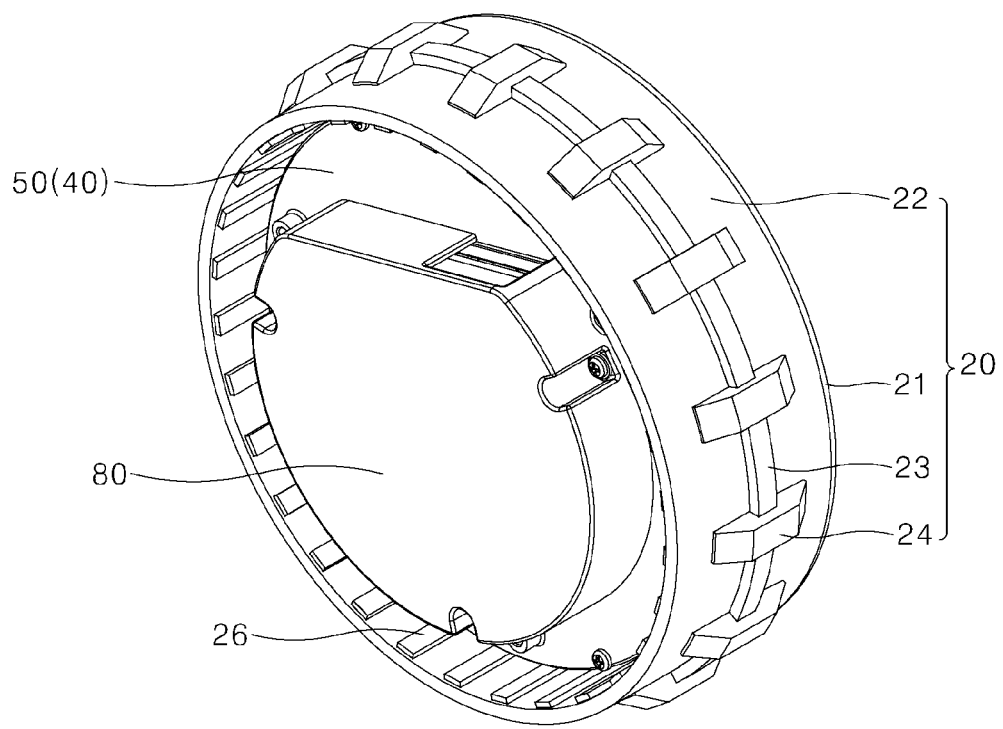
FIG. 15 is a perspective view illustrating a detailed configuration of the wheel and the motor in a structure in which the tire is removed from FIG. 14.
Figure 16:
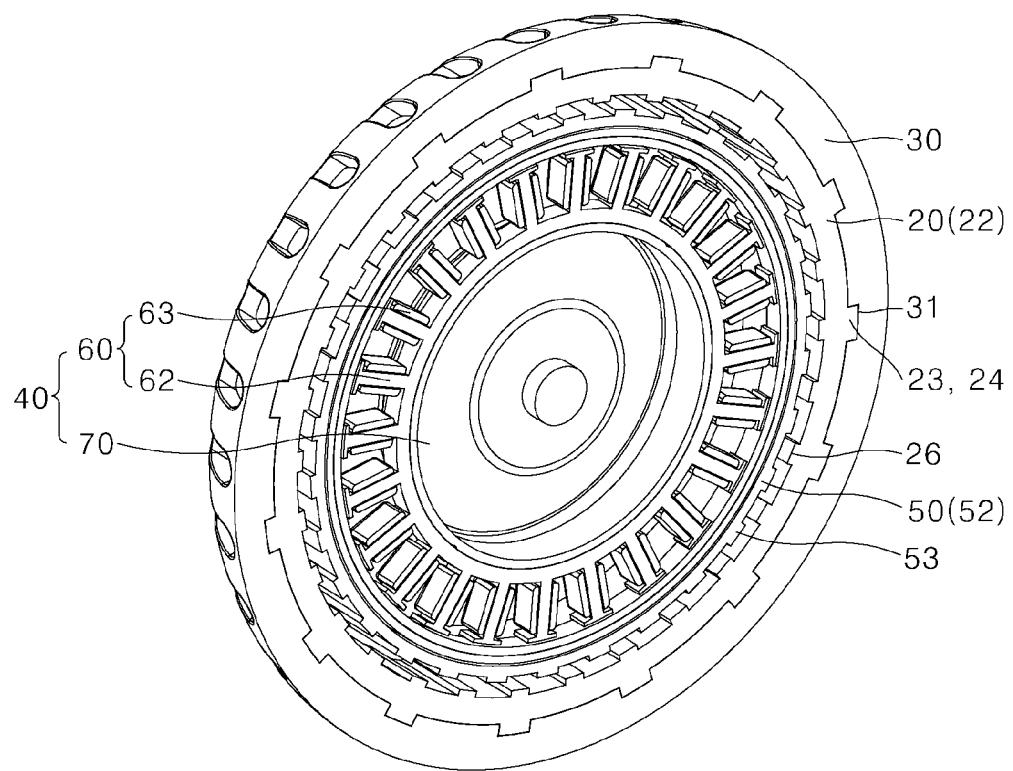
FIG. 16 is a cross-sectional view illustrating a detailed configuration of the tire, the wheel, and the motor of FIG. 14.
Figure 17:
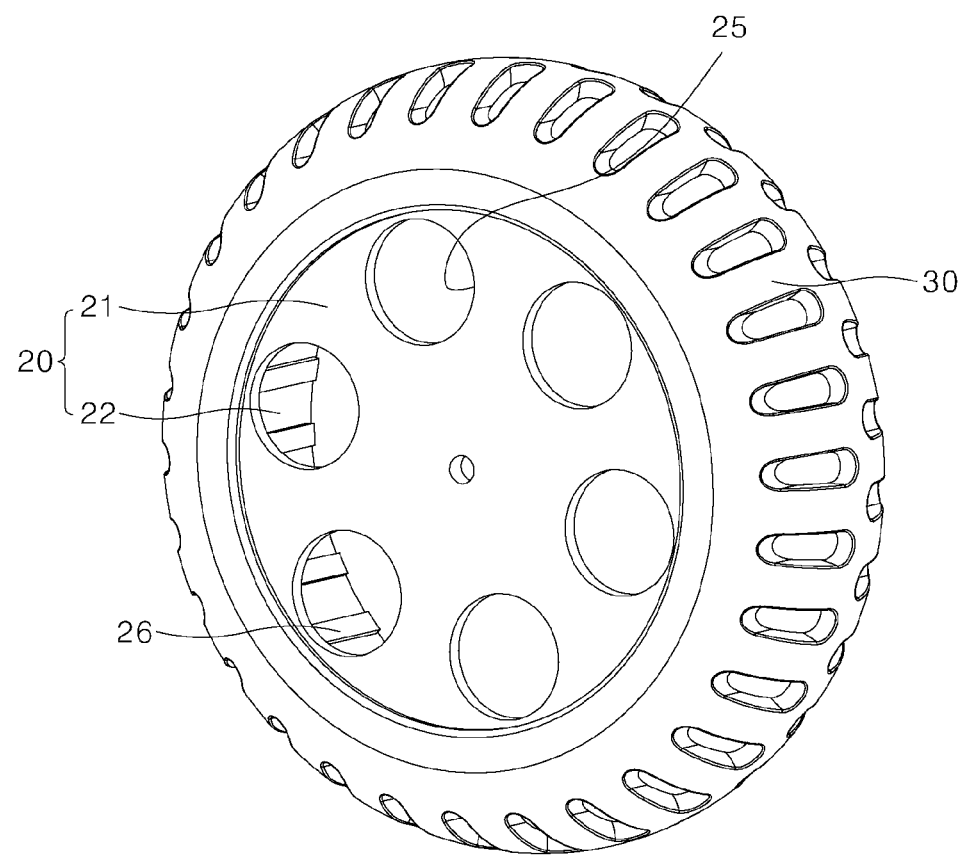
FIG. 17 is a front perspective view illustrating a wheel structure in the robot wheel driving apparatus according to one embodiment of the present disclosure.
Figure 18:
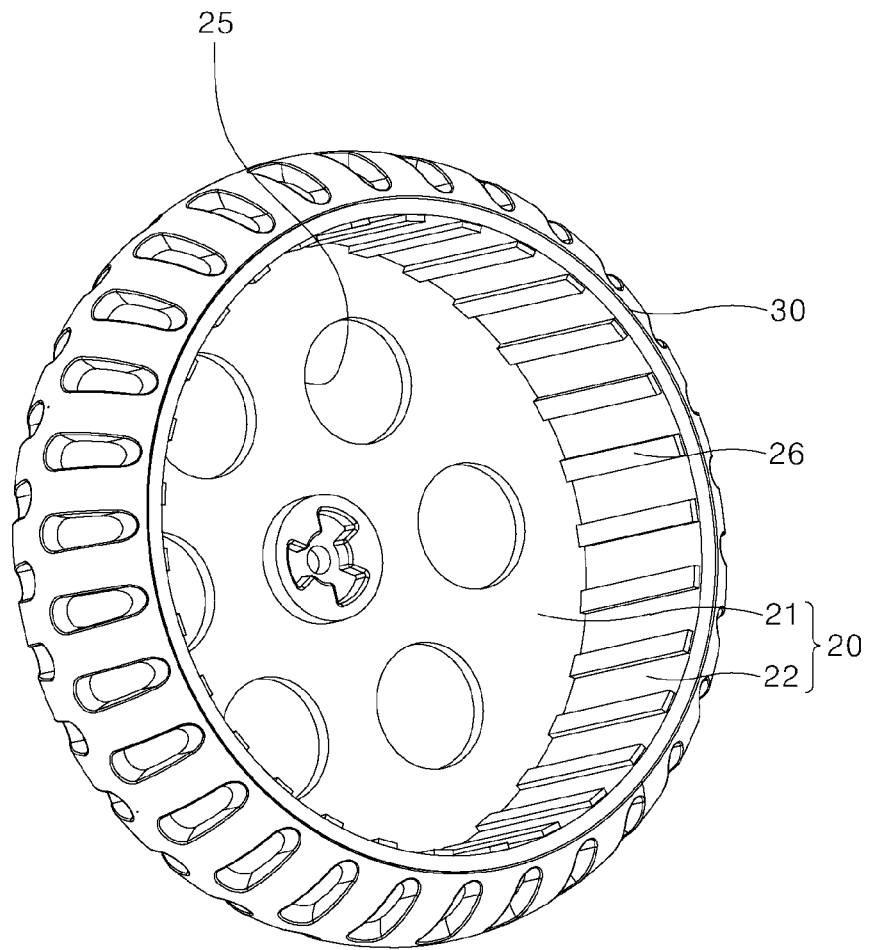
FIG. 18 is a rear perspective view illustrating the wheel structure in the robot wheel driving apparatus according to one embodiment of the present disclosure.
Figure 19:
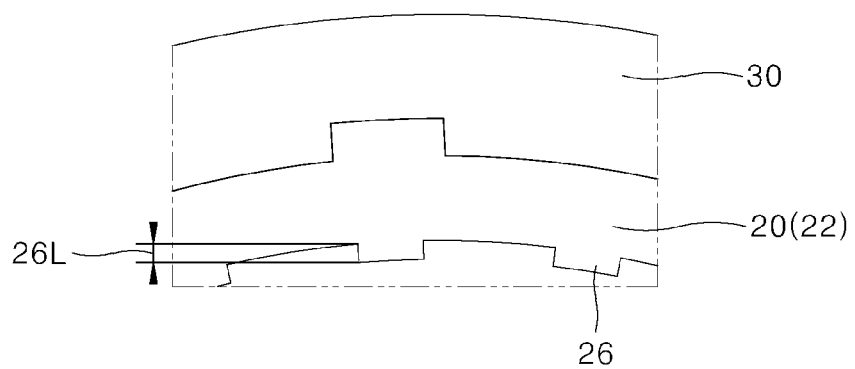
FIG. 19 is an enlarged cross-sectional view illustrating a protruding structure of a blade formed on the wheel.
Figure 20:
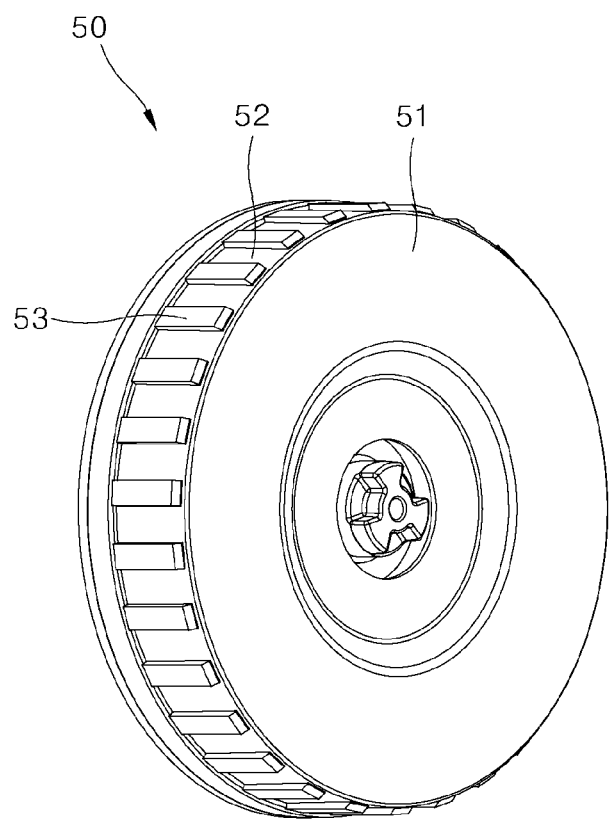
FIG. 20 is a perspective view illustrating a motor housing structure in the robot wheel driving apparatus according to one embodiment of the present disclosure.
Figure 21:
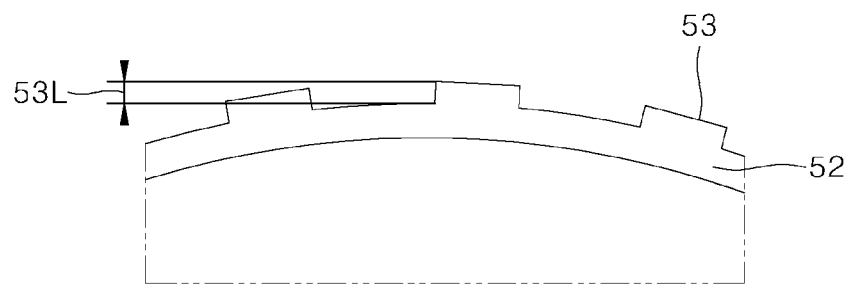
FIG. 21 is an enlarged cross-sectional view illustrating a protruding structure of heat-radiation fins formed on the motor housing.

FIGS. 1 to 5 are a front perspective view, a rear perspective view, a left side view, a right side view, and a front view schematically illustrating the entire structure of the robot wheel driving apparatus. In addition, FIGS. 6 and 7 are exploded views illustrating the entire structure of the robot wheel driving apparatus. FIG. 8 is a cross-sectional view illustrating the entire structure of the robot wheel driving apparatus, and FIGS. 9 to 11 are perspective views illustrating a wheel cover, a first wheel cover portion, and a second wheel cover portion. FIG. 12 is a view illustrating a left internal structure of the robot wheel driving apparatus with the first wheel cover portion removed, and FIG. 13 is a view illustrating a right internal structure of the robot wheel driving apparatus with the second wheel cover portion removed.

As illustrated, the robot wheel driving apparatus 1 according to the embodiment of the present disclosure includes a wheel cover 10, a wheel 20, a tire 30, a motor 40, and a motor housing 50.

The wheel 20 is a device connected to a leg of a robot to travel the robot and rotates the tire 30 by receiving a rotating force of the motor 40.

The wheel 20 may have a circular body. The tire 30 may be coupled to an outer circumferential surface of the wheel 20.

The wheel 20 includes a first wheel body portion 21 and a second wheel body portion 22.

The first wheel body portion 21 may have a disk shape.

The second wheel body portion 22 is a portion protruding in a circular tube shape along an edge of the disk-shaped first wheel body portion 21. The tire 30 may be mounted on an outer circumferential surface of the second wheel body portion 22.

The wheel cover 10 has a shape that protects the wheel 20 and the motor 40 embedded in the wheel 20 by covering both sides of the wheel 20. The wheel cover 10 may be connected to the wheel 20 by a link 15.

As a specific example, the wheel cover 10 includes a first wheel cover portion 11 and a second wheel cover portion 12.

The first wheel cover portion 11 may cover one side (e.g., a left side) of the wheel 20.

The second wheel cover portion 12 may cover the other side (e.g., a right side) of the wheel 20.

The first wheel cover portion 11 and the second wheel cover portion 12 may have the same shape to be symmetrical to each other with respect to the wheel 20.

The second wheel cover portion 12 may be coupled to the first wheel cover portion 11 to face the first wheel cover portion 11 with the wheel 20 interposed therebetween and may cover the other side (e.g., the right side) of the wheel 20.

The wheel cover 10 further includes a leg connector 13.

The leg connector 13 is a portion connecting the first wheel cover portion 11 and the second wheel cover portion 12 to a robot body.

As a specific example, the first wheel cover portion 11 includes a first cover body 111 and a first connector 113.

The first cover body 111 may have a hemispherical cap shape that convexly covers the one side (e.g., the left side) of the wheel 20 to secure a first internal space 112 having a predetermined size between the one side (e.g., the left side) of the wheel 20 and the first cover body 111.

The first connector 113 may have a shape straightly extending from an upper end of the first cover body 111 in a height direction. The first connector 113 connects the first cover body 111 to the leg connector 13.

As a specific example, the second wheel cover portion 12 includes a second cover body 121 and a second connector 123.

The second cover body 121 may have a hemispherical shape that convexly covers the other side (e.g., the right side) of the wheel 20 to secure a second internal space 122 having a predetermined size between the other side (e.g., the right side) of the wheel 20 and the second cover body 121.

The second connector 123 may have a shape straightly extending from an upper end of the second cover body 121 in the height direction. The second connector 123 connects the second cover body 121 to the leg connector 13.

In addition, a corrugated shape may be provided on a portion in which the first connector 113 and the second connector 123 are connected to the leg connector 13, and an impact at the connection portion may be buffered or the stretch and elongation of the connection portion may be adjusted using the corrugated shape.

A lower cover 14 may be further provided at a lower end of the wheel cover 10.

The lower cover 14 is coupled to the wheel cover 10 to cover a lower open region of the wheel cover 10.

For example, the lower cover 14 is coupled to cover an open portion between the tire 30 exposed to a lower portion of the wheel 20 and the wheel cover 10 when the wheel 20 and the wheel cover 10 are connected.

The lower cover 14 prevents external bulky foreign substances from flowing into the wheel 20 to damage the motor 40. Therefore, it is possible to improve the durability of the robot wheel driving apparatus 1 and improve stability in use and product reliability.

The link 15 may be further provided inside the wheel cover 10 (see FIGS. 6, 12, and 13).

Referring to FIGS. 6, 12, and 13, the link 15 is embedded in the wheel cover 10.

The link 15 is embedded in the wheel cover 10 and structurally connects the motor 40 to the wheel cover 10 to serve to constrain positions therebetween.

As an example, one end of the link 15 may be fixed to the inner side of the wheel cover 10. In addition, the other end of the link 15 may be fixed to one side of the motor 40.

For example, the one end of the link 15 may be formed of a rod-shaped straight link portion 151, and the other end of the link 15 may be formed of a circular link portion 152.

The straight link portion 151 may be fixed to an inner side of the first connector 113. However, the present disclosure is not limited thereto, and the straight link portion 151 may be fixed to an inner side of the second connector 123.

The circular link portion 152 may be connected to a lower end of the straight link portion 151 in a ring shape and fixed to the one side of the motor 40.

Figure 25:
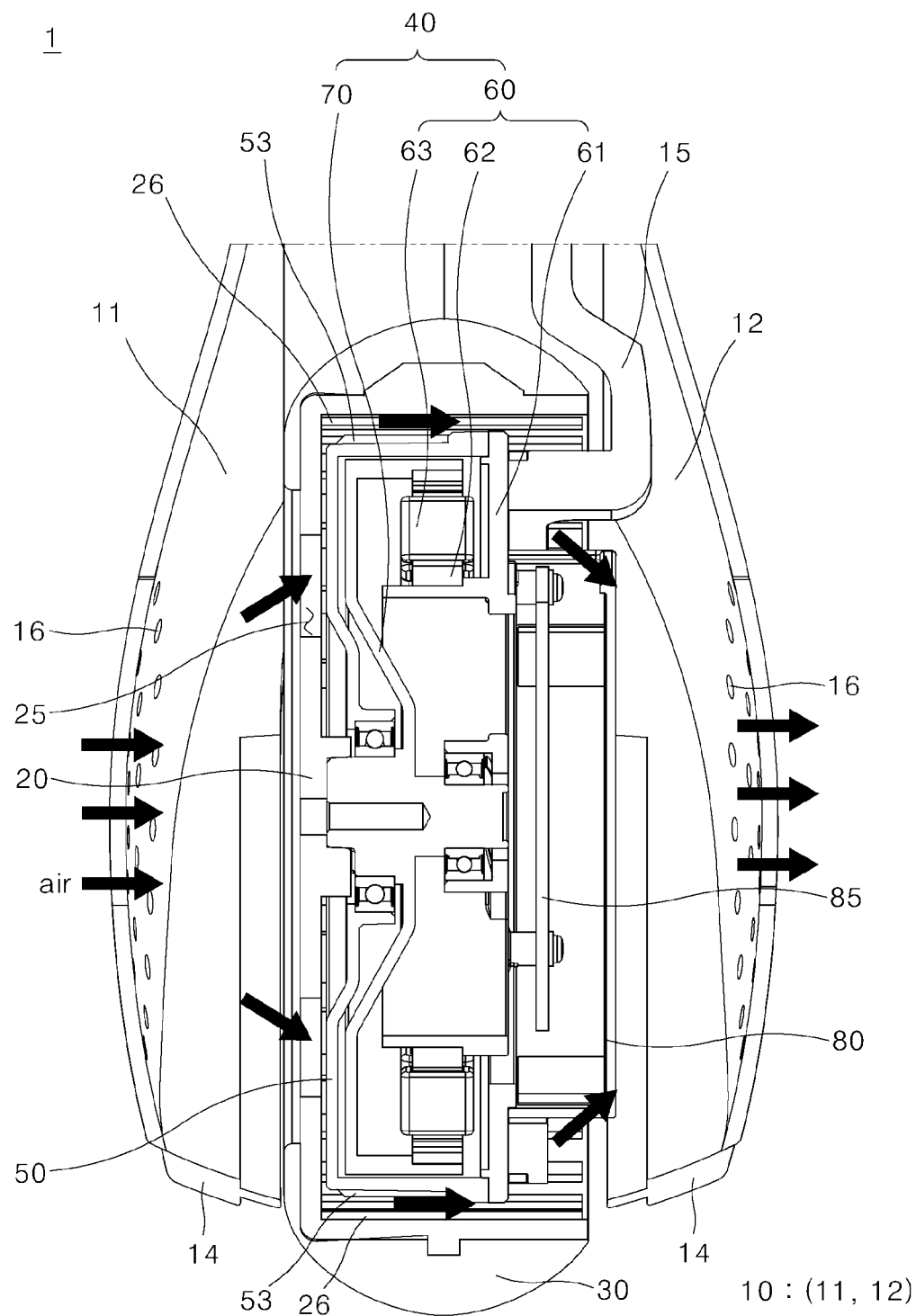
FIG. 25 is a conceptual diagram illustrating outside air flow in the robot wheel driving apparatus according to one embodiment of the present disclosure.

For example, the circular link portion 152 may be fixedly fastened to a stator frame 61 for supporting a stator 60 of the motor 40 (see FIG. 25). In addition, the circular link portion 152 may have a structure in which the inverter cover 80 protruding in a circular cap shape is inserted into an internal hollow of the circular link portion 152 and protrudes outward from the motor 40.

As described above, the link 15 may be connected to the stator frame 61, and the stator frame 61 may have a structure connected to the motor housing 50. Since the link 15, the stator frame 61, and the motor housing 50, which are made of a metal material, are connected to promote heat exchange, it is possible to suppress an increase in a temperature of the motor 40, more specifically, a coil 63.

The tire 30 is mounted on the wheel 20. The tire 30 is a member that rolls and rotates on the ground according to the rotation of the wheel 20 and moves the robot in a set direction.

Since the tire 30 repeatedly rubs against and is in contact with the ground, the tire 30 may be made of various materials in consideration of durability, slip prevention according to a type of the ground, or the like. For example, the tire 30 may be made of a material such as a rubber, but the present disclosure is not necessarily limited thereto.

In order to firmly mount the tire 30 on the wheel 20, a fastening groove 31 may be provided in an inner circumferential surface of the tire 30, and fastening protrusions 23 and 24 may be provided on the outer circumferential surface of the second wheel body portion 22. The fastening protrusions 23 and 24 may be fixedly inserted into the fastening groove 31 (see FIG. 7).

As an example, the fastening protrusions 23 and 24 include the first fastening protrusion 23 and the second fastening protrusion 24 having different shapes.

For example, the first fastening protrusion 23 may be formed in a ring-shaped band shape that surrounds the outer circumferential surface of the second wheel body portion 22 in a circumferential direction.

For example, the second fastening protrusion 24 may protrude in a direction intersecting the first fastening protrusion 23 and may be formed in a straight band shape having a predetermined length in a width direction of the tire. The second fastening protrusion 24 may have a trapezoidal cross section.

In addition, a plurality of second fastening protrusions 24 may be provided, and the plurality of fastening protrusions 24 may be formed to be spaced a predetermined distance from each other along the first fastening protrusion 23.

As described above, since the first fastening protrusion 23 and the second fastening protrusion 24 may have a shape that protrudes by intersecting each other, the tire 30 in which the fastening groove 31 may be fixedly fitted onto the first and second fastening protrusions 23 and 24 may be firmly mounted on the second wheel body portion 22.

The motor housing 50 is a case-shaped component in which the motor 40 is embedded. The motor housing 50 is seated on and coupled to the inner side of the wheel 20 (see FIG. 7).

Referring to FIG. 7, the motor housing 50 may have a cylindrical shape with one open surface and store the motor 40 therein through the one open surface.

For example, the motor housing 50 includes a first motor housing portion 51 and a second motor housing portion 52.

The first motor housing portion 51 is a disk-shaped body seated inside the wheel 20.

The first motor housing portion 51 may be in close contact with an inner side of the first wheel body portion 21.

The second motor housing portion 52 is a circular tube-shaped body that may be in close contact with the inner circumferential surface of the wheel 20.

The second motor housing portion 52 may be in close contact with an inner circumferential surface of the second wheel body portion 22.

Figure 24:
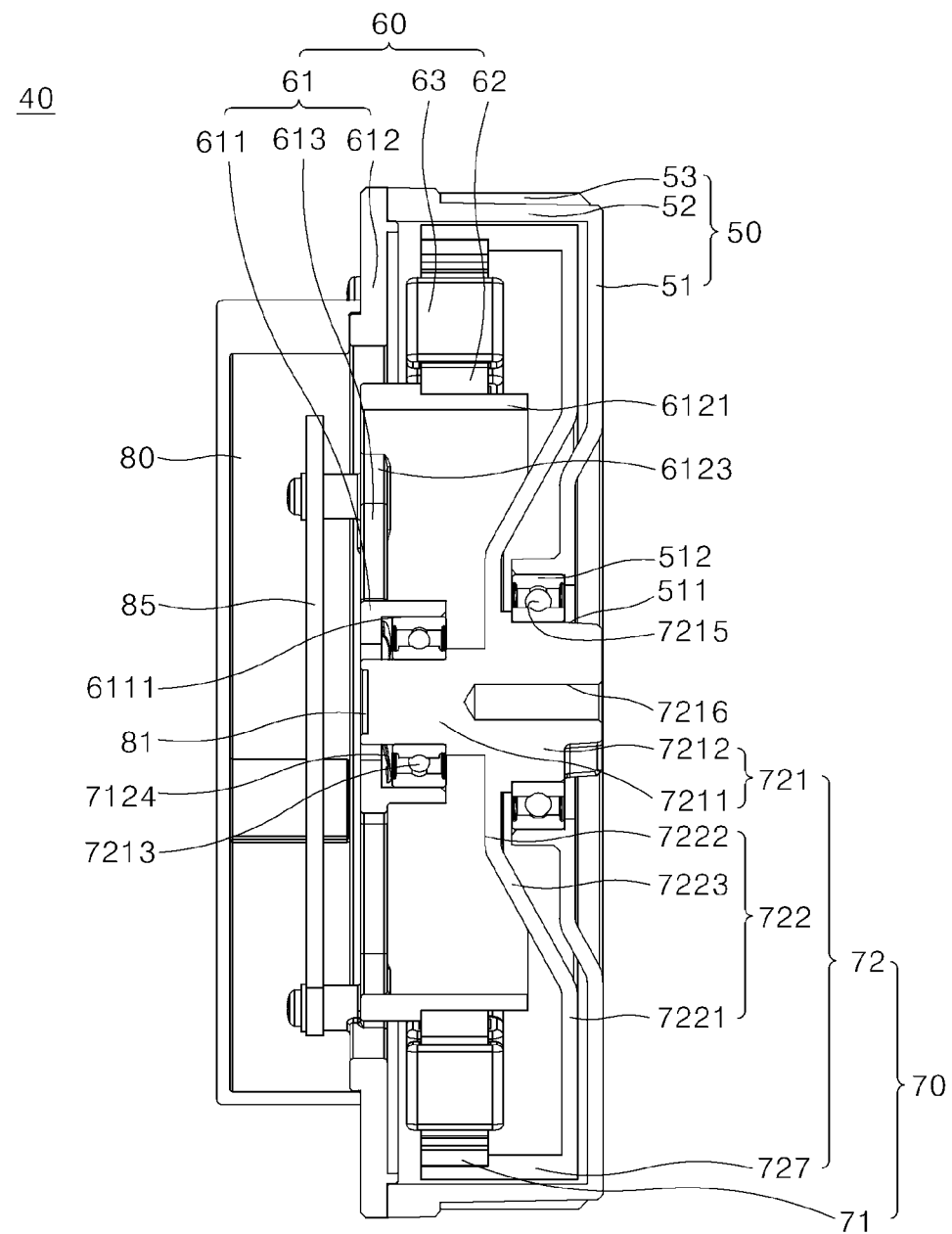
FIG. 24 is a cross-sectional view illustrating a detailed configuration of an inverter-integrated motor in the robot wheel driving apparatus according to one embodiment of the present disclosure.

A through hole 511 may be provided at the center of the first motor housing portion 51 (see FIGS. 7 and 24).

For example, the through hole 511 may be a circular hole having a predetermined diameter and formed to pass through the first motor housing portion 51 in a thickness direction.

The through hole 511 is a portion into which a rear end of a rotational shaft 721 (more specifically, the second rotational shaft portion 7212) of a rotor frame 72 is inserted to pass through the through hole 511 (see FIG. 24).

The rotor frame 72 is fastened to the wheel 20 to rotate with the wheel 20. To this end, the rotational shaft 721 of the rotor frame 72 may pass through the through hole 511 of the first motor housing portion 51, and the passing-through portion of the rotational shaft 721 and the wheel 20 may be integrally fastened using bolts.

The motor 40 is mounted inside the motor housing 50. The motor 40 is a device for providing a rotating force to the wheel 20.

In the embodiment of the present disclosure, the motor 40 is an inverter-integrated motor (see FIG. 7).

Referring to FIG. 7, the motor 40 includes a stator 60 and a rotor 70.

The stator 60 is fixedly mounted inside the motor housing 50.

The rotor 70 is disposed outside the stator 60 with an air gap interposed therebetween. The rotor 70 rotates about the stator 60 by supplying power.

For example, the stator 60 includes a plurality of coils 63 disposed in a circumferential direction, and a stator core 62 on which the plurality of coils 63 are wound and mounted (see FIG. 24).

The rotor 70 includes a magnet 71 and the rotor frame 72 (see FIG. 24).

The plurality of magnets 71 may be disposed in a circumferential direction to face the plurality of coils 63. In addition, the rotor frame 72 is a body that fixes the plurality of magnets 71, is concentrically connected to the wheel 20, and rotates inside the motor housing 50 (see FIG. 24).

The motor 40 is an inverter-integrated motor, and the inverter cover 80 may be connected to one side of the motor 40.

The inverter cover 80 may have a cylindrical cap shape that covers the one open surface of the motor housing 50. The inverter cover 80 may be connected to the motor 40 in an integrated structure (see FIG. 8).

A printed circuit board (PCB) 85 is positioned inside the inverter cover 80.

The PCB 85 is disposed to face the motor 40. Although not separately illustrated, the PCB 85 may include a capacitor formed of the MLCC, the aluminum electrolytic capacitor, and the like, and a plurality of inverter circuit elements. In addition, a component such as an encoder sensor for detecting the rotation of the motor 40 may be further disposed on the PCB 85.

Meanwhile, the robot wheel driving apparatus 1 according to one embodiment of the present disclosure has a structure in which the motor 40 is sealed from the outside by the wheel 20 and the wheel cover 10.

Therefore, the robot wheel driving apparatus 1 according to the embodiment of the present disclosure further includes a heat-dissipation structure that can improve heat-dissipation performance of the motor 40, thereby suppressing an increase in a temperature of the motor 40 (more specifically, the coil 63) and increasing a rated torque of the motor.

Hereinafter, a heat-dissipation structure of the robot wheel driving apparatus 1 according to the embodiment of the present disclosure will be described.

The robot wheel driving apparatus 1 according to the embodiment of the present disclosure includes a wheel cover heat-dissipation structure, a wheel heat-dissipation structure, and a motor frame heat-dissipation structure in order to improve the heat-dissipation performance of the motor 40 sealed by the wheel cover 10 and the wheel 20.

Hereinafter, the wheel cover heat-dissipation structure, the wheel heat-dissipation structure, and the motor frame heat-dissipation structure will be described in detail.

[Wheel Cover Heat-Dissipation Structure]

The wheel cover heat-dissipation structure of the robot wheel driving apparatus 1 according to the embodiment of the present disclosure will be described.

The wheel cover 10 according to the embodiment of the present disclosure includes a wheel cover hole 16.

As illustrated in FIGS. 1 to 21, the wheel cover 10 has a cover shape that covers both sides of the wheel 20 to protect the wheel 20 and the motor 40 embedded in the wheel 20.

For example, the wheel cover 10 includes the first wheel cover portion 11 for covering the one side (e.g., the left side) of the wheel 20 and the second wheel cover portion 12 for covering the other side (e.g., the right side) of the wheel 20.

The first wheel cover portion 11 and the second wheel cover portion 12 may have the same shape to be symmetrical to each other with respect to the wheel 20. In addition, the first wheel cover portion 11 and the second wheel cover portion 12 may be coupled to face each other with the wheel 20 interposed therebetween.

For example, the first wheel cover portion 11 includes the first cover body 111. The first cover body 111 may have a shape that convexly covers the one side (e.g., the left side) of the wheel 20 to secure a first internal space 112 having a predetermined size between the one side (e.g., the left side) of the wheel 20 and the first cover body 111.

The second wheel cover portion 12 includes the second cover body 121. The second cover body 121 may have a shape that convexly covers the other side (e.g., the right side) of the wheel 20 to secure a second internal space 122 having a predetermined size between the other side (e.g., the right side) of the wheel 20 and the second cover body 121.

In this case, the wheel cover hole 16 may be formed in a shape that passes through each of the wheel cover 10, that is, the first wheel cover portion 11 and the second wheel cover portion 12 coupled to face each other with the wheel 20 interposed therebetween.

The wheel cover holes 16 may be disposed in the first wheel cover portion 11 and the second wheel cover portion 12 in a shape symmetrical to each other. Therefore, it is possible to allow air to smoothly flow by allowing the air to be introduced from an arbitrary direction of both sides of the wheel 20 and allowing the air to be discharged in a direction opposite to a direction in which the air is introduced with the wheel 20 in which the motor 40 is embedded interposed therebetween.

Figure 3:
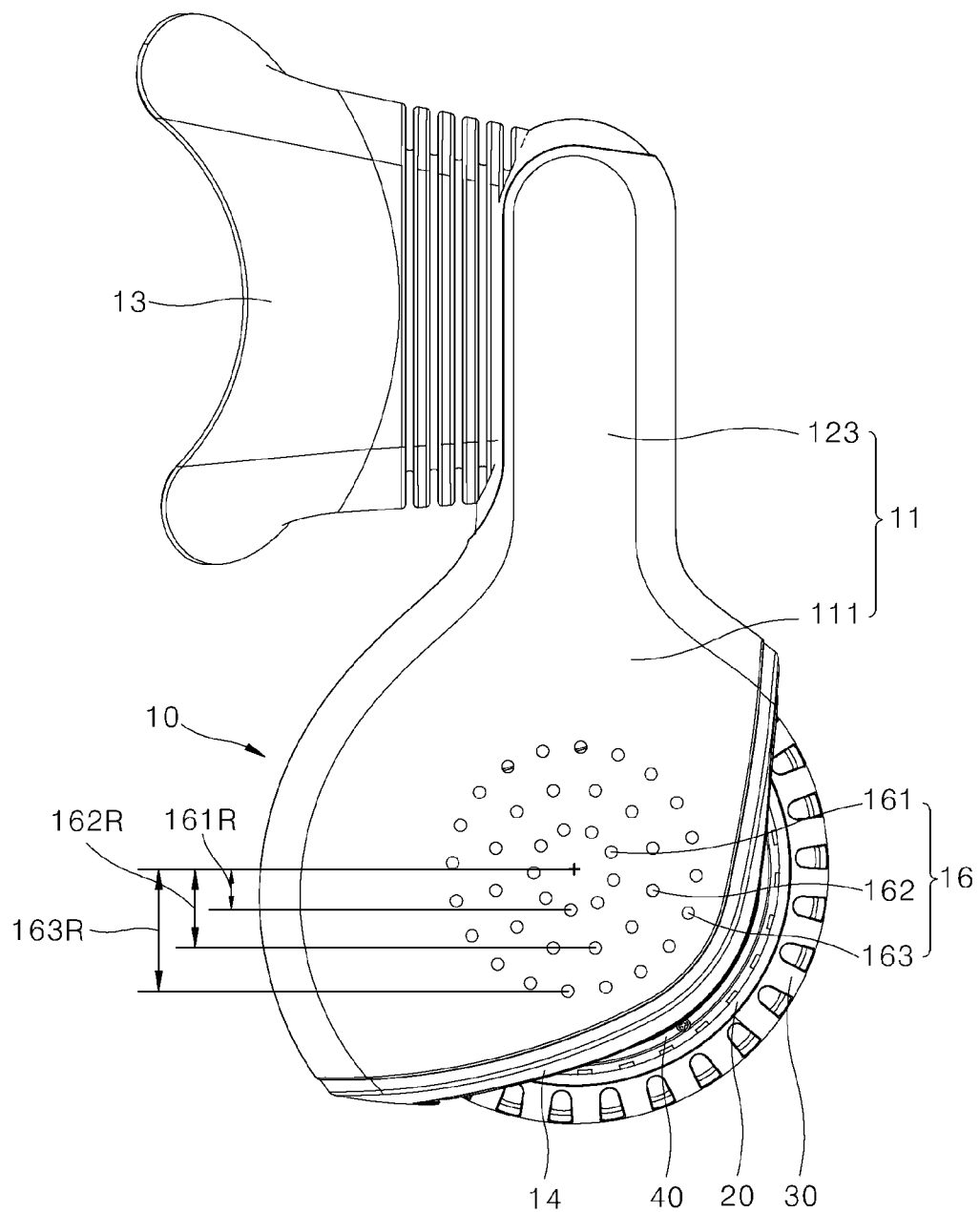
FIG. 3 is a left side view schematically illustrating the robot wheel driving apparatus according to one embodiment of the present disclosure.

As a specific example, the wheel cover hole 16 may be formed in the first cover body 111 (see FIGS. 3, 9, and 10).

Referring to FIGS. 3, 9, and 10, a plurality of wheel cover holes 16 may be formed radially with respect to the center of the motor 40 in the first cover body 111.

For example, the wheel cover hole 16 includes a first wheel cover hole 161, a second wheel cover hole 162, and a third wheel cover hole 163 (see FIG. 3).

Referring to FIG. 3, the first wheel cover hole 161 is a plurality of holes disposed to be spaced apart from each other in a circumferential direction along a circle having a first radius 161R with respect to the center of the motor 40 in the first cover body 111. The second wheel cover hole 162 is a plurality of holes disposed to be spaced apart from each other in a circumferential direction along a circle having a second radius 162R greater than the first radius 161R with respect to the center of the motor 40 in the first cover body 111. The third wheel cover hole 163 is a plurality of holes disposed to be spaced apart from each other in a circumferential direction along a circle having a third radius 163R greater than the second radius 162R with respect to the center of the motor 40 in the first cover body 111.

Figure 4:
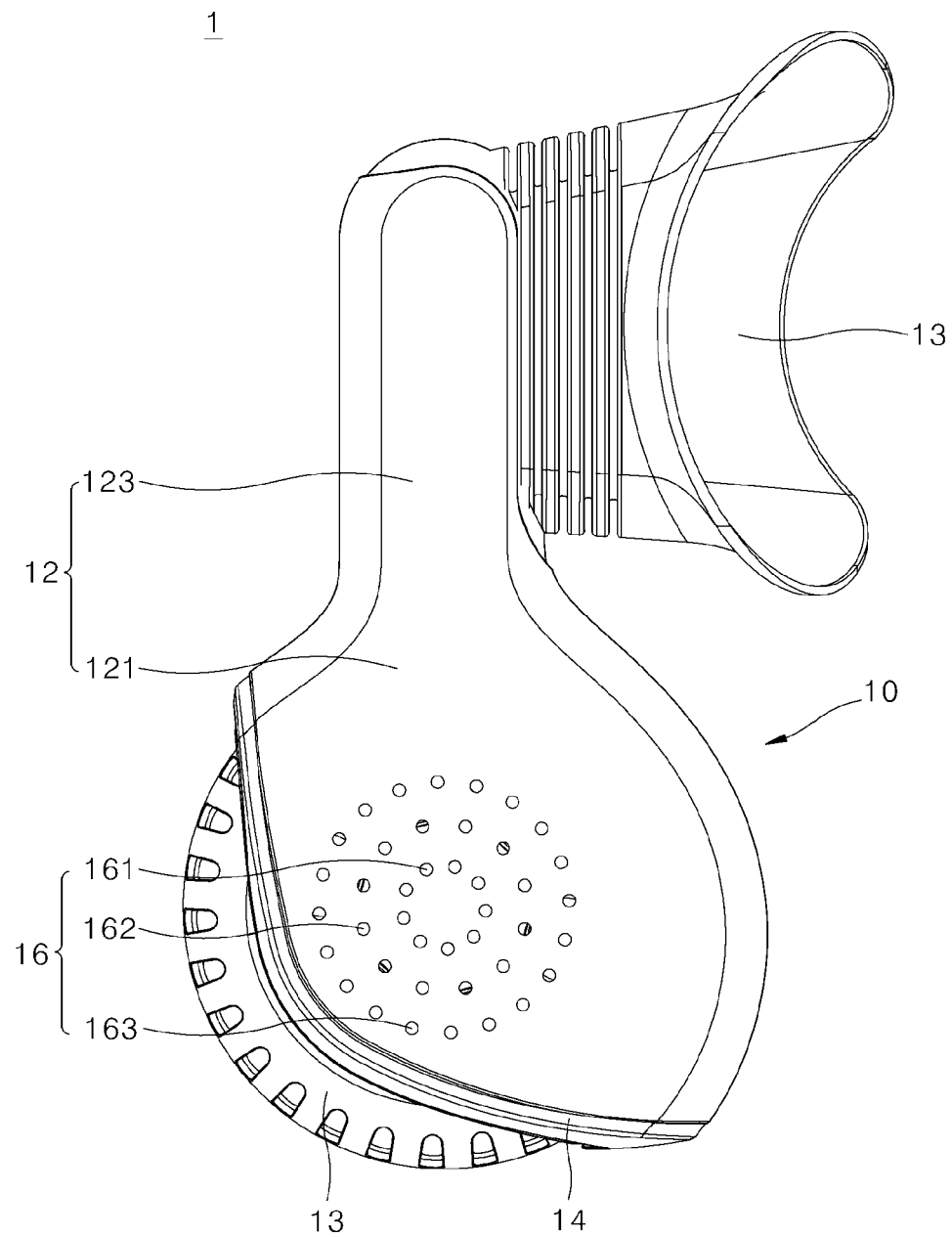
FIG. 4 is a right side view schematically illustrating the robot wheel driving apparatus according to one embodiment of the present disclosure.
Figure 5:
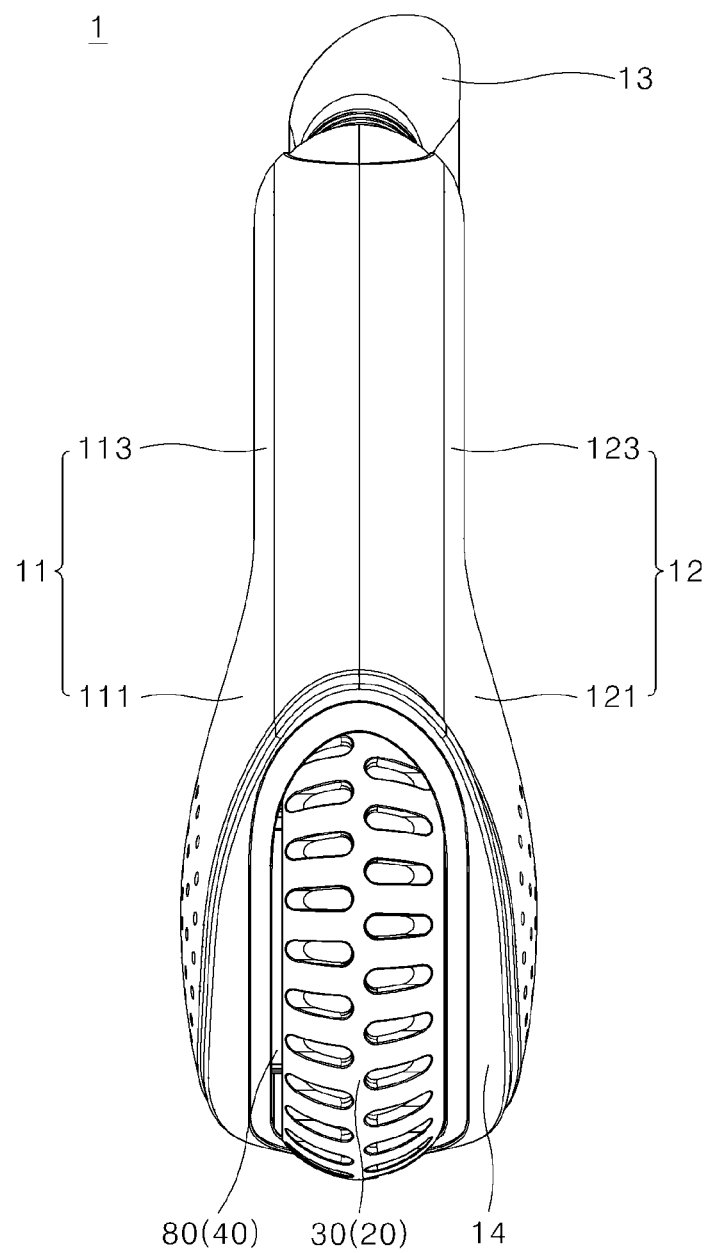
FIG. 5 is a front view schematically illustrating the robot wheel driving apparatus according to one embodiment of the present disclosure.

In addition, the wheel cover hole 16 may be formed in the second cover body 121 (see FIGS. 4, 9, and 11).

Referring to FIG. 4, a plurality of wheel cover holes 16 may be formed radially with respect to the center of the motor 40 in the second cover body 121.

For example, the wheel cover hole 16 includes the first wheel cover hole 161, the second wheel cover hole 162, and the third wheel cover hole 163 (see FIG. 4).

Referring to FIG. 4, the first wheel cover hole 161 is a plurality of holes disposed to be spaced apart from each other in the circumferential direction along the circle having the first radius 161R (see FIG. 3) with respect to the center of the motor 40 in the second cover body 121.

The second wheel cover hole 162 is a plurality of holes disposed to be spaced apart from each other in the circumferential direction along the circle having the second radius 162R (see FIG. 3) with respect to the center of the motor 40 in the second cover body 121.

The third wheel cover hole 163 is a plurality of holes disposed to be spaced apart from each other in the circumferential direction along the circle having the third radius 163R (see FIG. 3) with respect to the center of the motor 40 in the second cover body 121.

Here, when the wheel cover hole 16 is formed in the wheel cover 10, the size and arrangement thereof do not hinder the beauty of an exterior, and the wheel cover hole 16 may be formed in various modified shapes and arrangement structures as long as the shape does not affect a user's safety and structural reliability.

For example, the first wheel cover holes 161 may be disposed to be spaced apart from each other in the circumferential direction along a circle having the radius 161R of 20 mm with respect to the center of the motor. That is, the first wheel cover hole 161 may have a pitch circle diameter (PCD) of 20 mm. Each of the first wheel cover holes 161 may have a diameter of 3 mm. In addition, nine first wheel cover holes 161 may be formed.

For example, the second wheel cover holes 162 may be disposed to be spaced apart from each other in the circumferential direction along a circle having the radius 162R of 40 mm with respect to the center of the motor. That is, the second wheel cover hole 162 may have a PCD of 40 mm. Each of the second wheel cover holes 162 may have a diameter of 3 mm. In addition, sixteen second wheel cover holes 162 may be formed.

For example, the third wheel cover holes 163 may be disposed to be spaced apart from each other in the circumferential direction along a circle having the radius 163R of 60 mm with respect to the center of the motor. That is, the third wheel cover hole 163 may have a PCD of 60 mm. Each of the third wheel cover holes 163 may have a diameter of 3 mm. In addition, twenty third wheel cover holes 163 may be formed.

In addition, the first wheel cover hole 161, the second wheel cover hole 162, and the third wheel cover hole 163 are provided in all components of the wheel cover 10 disposed at both sides of the wheel 20, that is, both the first wheel cover portion 11 and the second wheel cover portion 12 and have a shape symmetrical to one another.

Therefore, air may be introduced into or discharged from both sides of the wheel 20 in a structure in which both sides are sealed by the wheel cover 10.

For example, referring to FIG. 25, outside air may be introduced through the wheel cover hole 16 of the first wheel cover portion 11, and the air may flow through the wheel 20, the motor housing 50, and the motor 40 and then may be discharged through the wheel cover hole 16 of the second wheel cover portion 12.

A flow direction of the air may be a direction opposite to that illustrated in FIG. 25. For example, outside air may be introduced through the wheel cover hole 16 of the second wheel cover portion 12 and then discharged through the wheel cover hole 16 of the first wheel cover portion 11 after passing through the wheel 20, the motor housing 50, and the motor 40.

[Wheel Heat-Dissipation Structure]

The wheel heat-dissipation structure of the robot wheel driving apparatus 1 according to the embodiment of the present disclosure will be described.

The wheel 20 in the robot wheel driving apparatus 1 according to the embodiment of the present disclosure includes a wheel hole 25 and a blade 26 for heat dissipation.

The wheel 20 rotates the tire 30 by receiving the rotating force of the motor 40 and has a circular body, and the tire 30 is coupled to the outer circumferential surface of the wheel 20.

For example, the wheel 20 includes the disk-shaped first wheel body portion 21 and the second wheel body portion 22 protruding in a circular tube shape along an edge of the disk-shaped first wheel body portion 21. The tire 30 is mounted on the outer circumferential surface of the second wheel body portion 22.

The wheel hole 25 may allow the outside air introduced through the wheel cover 10 to pass through the wheel 20 to flow between the wheel 20 and the motor housing 50.

The wheel hole 25 may be formed in the first wheel body portion 21 (see FIGS. 7, 13, 17, and 18).

For example, the wheel hole 25 may be positioned at a middle point in a radial direction between the center of the motor 40 and the tire 30 in the first wheel body portion 21. Therefore, the wheel hole 25 may allow as much outside air as possible to flow into the wheel 20 while securing the structural reliability of the wheel 20.

For example, a plurality of wheel holes 25 may be provided.

The plurality of wheel holes 25 may be disposed to be spaced apart from each other in the circumferential direction along a circle having a set radius with respect to the center of the motor in the first wheel body portion 21.

In addition, each of the plurality of wheel holes 25 may be a circular hole having the same diameter.

The wheel hole 25 may be formed in the disk-shaped first wheel body portion 21 disposed to face the wheel cover 10. Therefore, the outside air introduced through the wheel cover hole 16 may pass through the wheel hole 25 and flow into the wheel 20.

As an example, six wheel holes 25 may be disposed in the circumferential direction along the circle having a radius of 60 mm with respect to the center of the motor 40.

As an exemplary example, each of the wheel holes 25 may be a circular hole having a size of at least 10 times a diameter of the first wheel cover hole 161, the second wheel cover hole 162, or the third wheel cover hole 163 included in the wheel cover hole 16.

For example, when the diameter of the first wheel cover hole 161, the second wheel cover hole 162, or the third wheel cover hole 163 is 3 mm, the diameter of each of the wheel holes 25 may be 30 mm.

When the diameter of the wheel cover hole 16 is excessively large, external foreign substances may enter the wheel cover 10. Therefore, the wheel cover hole 16 may arrange the plurality of holes having a small diameter radially at the center of the motor.

Unlike this, the wheel hole 25 has a relatively greater diameter than the wheel cover hole 6 because it is in a state in which the entry of the external foreign substances is already blocked by the wheel cover 10. Therefore, a larger amount of outside air introduced through the wheel cover hole 16 may flow into the wheel 20 through the wheel hole 25.

The blade 26 may have a wing shape protruding toward the motor housing 50 from the inner side of the wheel 20.

The blade 26 rotates with the wheel 20. The blade 26 may allow the outside air supplied to a gap between the wheel 20 and the motor housing 50 to forcibly flow.

The blade 26 may be formed on the inner circumferential surface of the second wheel body portion 22 (see FIGS. 7, 12, and 14 to 19).

For example, a plurality of blades 26 may be provided.

The plurality of blades 26 may be disposed to be spaced apart from each other in the circumferential direction along the inner circumferential surface of the second wheel body portion 22.

Each of the blades 26 may protrude a set protrusion length 26L (see FIG. 19) from the inner circumferential surface of the second wheel body portion 22 in the radial direction of the motor 40.

In this case, the protrusion length 26L (see FIG. 19) of each of the plurality of blades 26 may be formed shorter than a distance between the second wheel body portion 22 and the motor housing 50.

The plurality of blades 26 may be disposed to be spaced apart from each other in the circumferential direction along the inner circumferential surface of the wheel 20 (specifically, the inner circumferential surface of the second wheel body portion 22) and may have a straight wing shape that is straightly formed without tilting in a tangential direction.

The wheel 20 may be injection-molded using a plastic material. In this case, when the blade 26 has the straight wing shape, it is possible to facilitate a process of removing the wheel 20 from a mold after forming the wheel 20.

When the plurality of blades 26 are formed on an inner surface of the second wheel body portion 22, the plurality of blades 26 rotate with the wheel 20 when the wheel 20 rotates. In addition, air flow may be generated through a distance between the wheel 20 and the motor housing 50, that is, an air gap between the wheel 20 and the motor housing 50, by rotating operations of the plurality of blades 26.

Referring to FIG. 25, outside air flows into the wheel 20 through the wheel cover hole 16 of the first wheel cover portion 11. Subsequently, the outside air may pass through the wheel hole 25 and move between the wheel 20 and the motor housing 50.

At this time, when the plurality of blades 26 formed on the wheel 20 rotate, the air introduced from the outside through the air gap between the wheel 20 and the motor housing 50 forcibly flows in a set direction. It is possible to improve the heat-dissipation performance of the motor housing 50 surrounding the motor 40 by the flow of the outside air. As a result, it is possible to suppress the increase in the temperature of the coil 63 embedded in the motor housing 50.

[Motor Housing Heat-Dissipation Structure]

The motor housing heat-dissipation structure of the robot wheel driving apparatus 1 according to the embodiment of the present disclosure will be described.

The motor housing 50 in the robot wheel driving apparatus 1 according to the embodiment of the present disclosure includes a heat-radiation fin 53 for heat dissipation.

The motor housing 50 includes the first motor housing portion 51 and the second motor housing portion (see FIG. 7). The first motor housing portion 51 is a disk-shaped portion disposed to face the first wheel body portion 21. The second motor housing portion 52 is a circular tube-shaped portion disposed to face the second wheel body portion 22 with an air gap interposed therebetween.

The heat-radiation fins 53 may be formed on an outer circumferential surface (i.e., a circumferential surface) of the second motor housing portion 52. In addition, the heat-radiation fins 53 may protrude in the radial direction to increase a heat-radiation surface area of the second motor housing portion 52 (see FIGS. 7, 16, 20, and 21).

For example, a plurality of heat-radiation fins 53 may be provided.

The plurality of heat-radiation fins 53 may be disposed to be spaced apart from each other in the circumferential direction along the outer circumferential surface of the second motor housing portion 52.

Each of the plurality of heat-radiation fins 53 may protrude a set protrusion length 53L (see FIG. 21) from the outer circumferential surface of the second motor housing portion 52.

Figure 22:
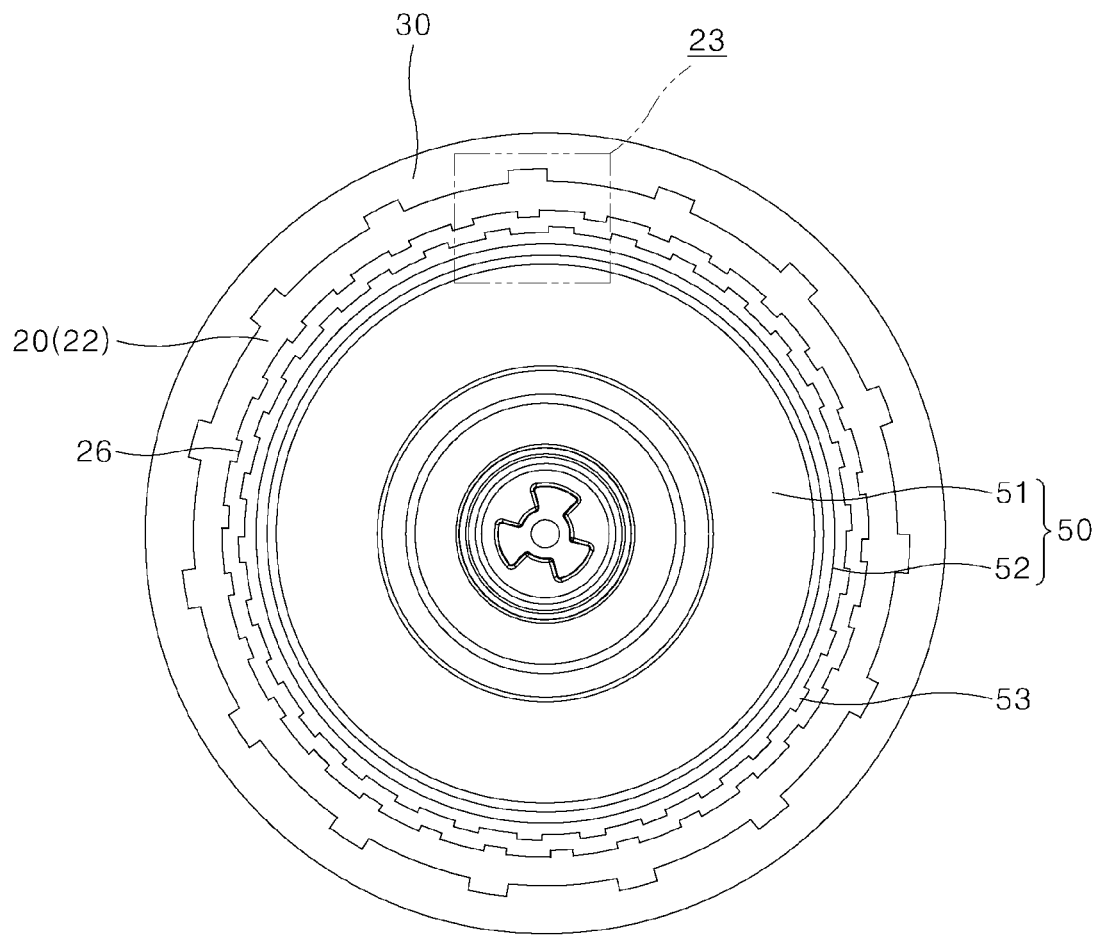
FIG. 22 is a conceptual diagram illustrating structures of the blade of the wheel and the heat-radiation fins of the motor housing in the robot wheel driving apparatus according to one embodiment of the present disclosure.

Referring to FIG. 22, each of the plurality of heat-radiation fins 53 may protrude from the outer circumferential surface of the second motor housing portion 52 toward the plurality of blades 26 that protrude from the inner circumferential surface of the second wheel body portion 22 to face each of the plurality of blades 26.

In this case, the protrusion length 26L (see FIG. 19) of each of the plurality of blades 26 may be the same as the protrusion length 53L (see FIG. 21) of each of the plurality of heat-radiation fins 53.

For example, the protrusion length 26L (see FIG. 19) of the blade 26 may be 1 mm. The blade 26 may protrude from the outer circumferential surface of the second wheel body portion 22 in a straight shape without tilting in a tangential direction.

For example, the protrusion length 53L (see FIG. 21) of the heat-radiation fins 53 may be 1 mm. Due to the size limitations of the wheel 20, the tire 30, and the motor 40, an air gap between the inner circumferential surface of the wheel 20 (i.e., an inner diameter of the second wheel body portion 22) and the outer circumferential surface of the motor housing 50 (i.e., an outer diameter of the second motor housing portion 52) may be 3.5 mm. In this case, considering a cumulative tolerance of ±0.5 mm for the manufacturing and assembly of each of the wheel 20 and the motor housing 50, it is preferable that each of the blade 26 and the heat-radiation fin 53 identically has the protrusion length of 1 mm.

Figure 23:
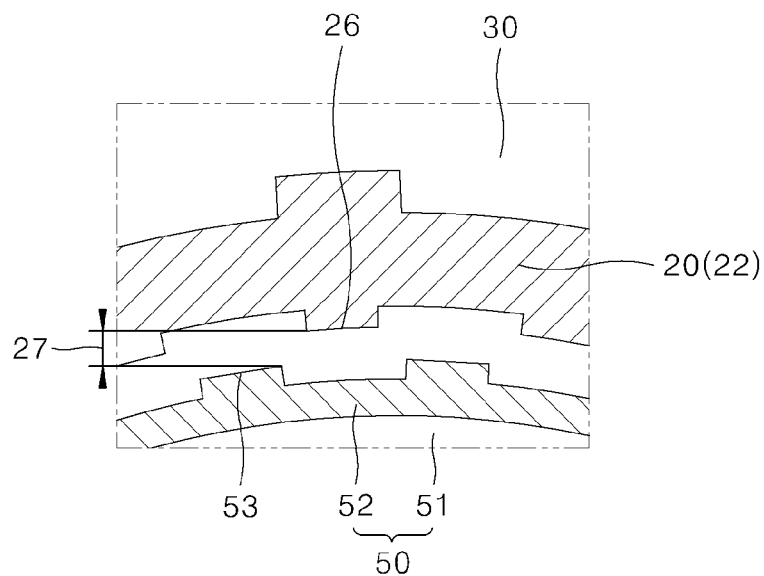
FIG. 23 is an enlarged cross-sectional view of region "23" in FIG. 22.

In addition, a gap 27 (see FIG. 23) having a set size may be formed between each of the blades 26 and each of the heat-radiation fins 53.

For example, the gap 27 between the blade 26 and the heat-radiation fins 53 may be 1.5±0.5 mm.

A flow rate of air between the wheel 20 and the motor housing 50 may increase through the gap 27 (see FIG. 23), thereby improving the heat-dissipation effect.

Referring to FIG. 25, the outside air introduced through the wheel cover hole 16 may flow into the gap space between the wheel 20 and the motor housing 50 through the wheel hole 25.

In addition, outside air forcibly flows between the wheel 20 and the motor housing 50 by the rotation of the plurality of blades 26 rotating with the wheel 20.

In addition, the heat-radiation fin 53 is formed at a position facing the blade 26.

Therefore, it is possible to increase the heat-radiation surface area of the motor housing 50, thereby further improving the heat-dissipation performance of the motor due to the air flow according to the rotation of the blade 26.

As a result, it is possible to maximize the effect of suppressing the increase in the temperature of the coil 63 in the motor 40 having the inverter-integrated structure sealed by the wheel cover 10 and the wheel 20 and embedded in the motor housing 50.

Furthermore, there is an advantage in that since the entire size of the motor 40 may not be increased by appropriately arranging the blades 26 and the heat-radiation fins 53 using the air gap, that is, the gap space between the wheel 20 and/or the motor housing 50, it is possible to achieve the miniaturization and light-weight of the motor 40.

[Detailed Structure of Motor]

Hereinafter, a detailed structure of the inverter-integrated motor applicable to the robot wheel driving apparatus according to the embodiment of the present disclosure will be described in detail.

Referring to FIG. 8, the inverter-integrated motor 40 has a structure sealed from the outside by the wheel cover 10 (11 and 12) and the wheel 20.

The wheel 20 rotates by receiving the rotating force of the motor 40, and the tire 30 is mounted on the wheel 20 to allow the robot to travel.

FIG. 24 illustrates a detailed structure of the motor 40 included in the robot wheel driving apparatus 1 according to the embodiment of the present disclosure.

As illustrated, the motor 40 is embedded in the motor housing 50.

The motor housing 50 has a cylindrical shape with one open surface, and the motor 40 is inserted using the one open surface of the motor housing 50 and embedded in the motor housing 50.

The motor housing 50 includes the first motor housing portion 51 and the second motor housing portion 52.

The first motor housing portion 51 is a disk-shaped body seated inside the wheel 20. The second motor housing portion 52 is a circular tube-shaped body that may be in close contact with the inner circumferential surface of the wheel 20.

The motor 40 is a device for providing a rotating force to the wheel 20.

As a specific example, the motor 40 includes the stator 60 and the rotor 70.

The stator 60 is fixedly mounted inside the motor housing 50. For example, the stator 60 includes the plurality of coils 63 disposed in the circumferential direction and the stator core 62 on which the plurality of coils 63 are wound and mounted.

The rotor 70 is disposed outside the stator 60 with an air gap interposed therebetween and rotates about the stator 60 by supplying power.

For example, the rotor 70 includes the plurality of magnets 71 disposed in the circumferential direction to face the plurality of coils 63 and the rotor frame 72 fixing the plurality of magnets 71 and concentrically connected to the wheel 20.

The rotor frame 72 rotates inside the motor housing 50. The rotor frame 72 includes the rotational shaft 721, a first rotor frame portion 722, and a second rotor frame portion 727.

The rotational shaft 721 is a shaft positioned at the rotation center of the rotor frame 72. For example, the rotational shaft 721 may be formed in a rounded rod shape elongated in a central direction of the motor 40.

As an example, the rotational shaft 721 includes a first rotational shaft portion 7211 and a second rotational shaft portion 7212.

The first rotational shaft portion 7211 is a portion positioned at a front end of the rotational shaft 721 and is supported by a first bearing 7213.

The second rotational shaft portion 7212 is a portion positioned at a rear end of the rotational shaft 721 and has a shape having a greater diameter than the first rotational shaft portion 7211.

The second rotational shaft portion 7212 is integrally connected to a rear end of the first rotational shaft portion 7211 and supported by a second bearing 7215 spaced apart from the first bearing 7213 in a front-rear direction.

A wave washer 7214 may be further provided at a front end of the first bearing 7213.

The first rotor frame portion 722 is a disk-shaped body connected to the rotational shaft 721.

The second rotor frame portion 727 is a circular tube-shaped body protruding a predetermined length from an edge of the first rotor frame portion 722 and may have the plurality of magnets 71 fixedly disposed to be surrounded in the circumferential direction.

For example, the first rotor frame portion 722 includes an outer frame 7221, an inner frame 7222, and an inclined frame 7223.

The outer frame 7221 is a disk-shaped frame formed at a position far from the center of the motor 40 in the radial direction.

The inner frame 7222 is a disk-shaped frame formed at a position close to the center of the motor 40 in the radial direction and connected to the outer frame 7221 with a step therebetween. That is, the inner frame 7222 is disposed to have a height difference from the outer frame 7221.

The inclined frame 7223 connects the outer frame 7221 to the inner frame 7222.

Meanwhile, a sensor magnet 81 may be coupled to the rotational shaft 721. The sensor magnet 81 may be coupled to a front end of the first rotational shaft portion 7211. For example, the sensor magnet 81 may be positioned to face an encoder sensor disposed on the PCB 85 at a set distance. Therefore, the encoder sensor may detect the rotation of the motor 40 by detecting the sensor magnet 81 coupled to the front end of the first rotational shaft portion 7211.

In addition, a female screw-shaped fastening groove 7216 for bolt-fastening with the wheel 20 is provided at the rear of the second rotational shaft portion 7212 positioned at the rear end of the rotational shaft 721. The fastening groove 7216 is positioned at the center of the rotational shaft 721, and a bolt passing through the center of the wheel 20 is fastened thereto.

By such a method, the wheel 20 and the rotor frame 72 may be concentrically bolt-fastened to rotate together. As a result, when the rotor frame 72 rotates within the motor housing 50, the rotating force may be transmitted to the wheel 20 so that the wheel 20 required for the robot to travel may rotate.

The stator 60 further includes the stator frame 61 together with the plurality of coils 63 and the stator core 62. The stator frame 61 is a frame for supporting the stator core 62.

One surface of the stator frame 61 may be coupled to the motor housing 50 to cover the one open surface of the motor housing 50. In addition, the other surface of the stator frame 61 may be coupled by being covered by the inverter cover 80. In this case, the PCB 85 may be fastened to the stator frame 61 and fixedly positioned inside the inverter cover 80.

The stator frame 61 includes the first stator frame portion 611, the second stator frame portion 612, and the third stator frame portion 613.

The first stator frame portion 611 may have a circularly protruding shape to face the center of the motor 40. The second stator frame portion 612 may have a shape that circularly protrudes at a distance in the radial direction from the first stator frame portion 611. The third stator frame portion 613 is a spoke-shaped support that radially connects the first stator frame portion 611 to the second stator frame portion 612. In this case, the PCB 85 may be fastened to the second stator frame portion 612.

A cylindrical groove 6111 is formed at the center of the first stator frame portion 611. The cylindrical groove 6111 is a region where a front end of the first rotational shaft portion 7211 is inserted and supported.

In addition, the first bearing 7213 is inserted between the cylindrical groove 6111 and the front end of the first rotational shaft portion 7211 to support the first rotational shaft portion 7211.

The second rotational shaft portion 7212 is supported by the second bearing 7215.

The through hole 511 is provided at the center of the first motor housing portion 51, the cylindrical support groove 512 is provided around the through hole 511, and the second bearing 7215 is inserted into the support groove 512 to support the second rotational shaft portion 7212.

Meanwhile, the second stator frame portion 612 includes a circular protrusion 6121 protruding from the inside of the motor 40.

The circular protrusion 6121 protrudes toward the inside of the motor and has a structure in which the protruding outer circumferential surface of the circular protrusion 6121 and the inner circumferential surface of the stator core 62 are firmly supported in contact with each other.

In addition, the second stator frame portion 612 includes a plurality of PCB fastening portions 6123. The plurality of PCB fastening portions 6123 are circular boss-shaped structures to which bolts are fastened and may firmly couple the PCB 85 to the second stator frame portion 612 by a method in which the bolts passing through the PCB 85 are fastened to the PCB fastening portions 6123.

FIG. 25 is a conceptual diagram illustrating outside air flow in the robot wheel driving apparatus according to one embodiment of the present disclosure.

The robot wheel driving apparatus 1 according to the embodiment of the present disclosure is directed to preventing the increase in the temperature of the inverter-integrated motor 40 (in particular, the coil 63) embedded in the motor housing 50 surrounded by the wheel cover 10 and the wheel 20 and inserted into the wheel 20.

To this end, the robot wheel driving apparatus 1 includes the wheel cover holes 16 formed in the first wheel cover portion 11 and the second wheel cover portion 12, the wheel hole 25 and the blade 26 formed on the wheel 20, and the heat-radiation fins 53 formed in the motor housing 50.

For example, an arrow direction illustrated in FIG. 25 indicates flow of outside air. As illustrated, the outside air flows into the wheel 20 through the wheel cover hole 16 of the first wheel cover portion 11.

Subsequently, the outside air may flow into the wheel 20 through the wheel hole 25 and move between the inner circumferential surface of the wheel 20 and the outer circumferential surface of the motor housing 50.

When the wheel 20 rotates, the blade 26 positioned on the inner circumferential surface of the wheel 20 rotates with the wheel 20, and air forcibly rotates through the air gap between the wheel 20 and the motor housing 50, and a flow rate of the air increases. Therefore, it is possible to improve the heat-dissipation performance of the motor housing 50.

Furthermore, the heat-radiation fin 53 protruding to face the blade 26 may be further provided on the outer circumferential surface of the motor housing 50 to increase the heat-radiation surface area of the motor housing 50. Therefore, it is possible to further improve the heat-dissipation performance of the motor housing 50 due to the increase in the flow rate of the air by the blades 26 and the increase in the heat-radiation surface area by the heat-radiation fins 53. As a result, it is possible to maximize the effect of suppressing the increase in the temperature of the motor 40 (more specifically, the coil 63) embedded in the motor housing 50.

Thereafter, the air flowing through the air gap between the wheel 20 and the motor housing 40 may be discharged to the outside through the wheel cover hole 16 of the second wheel cover portion 12 positioned at an opposite side of the first wheel cover portion 11.

In addition, the robot wheel driving apparatus 1 according to the embodiment of the present disclosure can promote heat exchange using the connection structure between the motor housing 50, the stator frame 61, and the link 15, thereby improving the heat-dissipation performance of the motor 40.

At least a part of the one surface of the stator frame 61 is coupled in contact with the motor housing 50 to cover the one open surface of the motor housing 50. In addition, the inverter cover 80 is coupled to the other surface of the stator frame 61.

The link 15 has a structure that extends to the outside of the wheel 20, and specifically, the link 15 is embedded in the wheel cover 10 and structurally connects the motor 40 to the upper end portion of the wheel cover 10 to fix the position of the motor 40.

For example, the link 15 includes the straight link portion 151 (see FIG. 12) coupled to the wheel cover and the circular link portion 152 (see FIG. 12) coupled in close contact therewith along the edge of the stator frame 61. The inverter cover 80 may be inserted into the internal hollow of the circular link portion 152.

Referring to FIG. 25, the link 15 (specifically, the circular link portion 152 (see FIG. 12)) may have a structure that is connected to the motor housing 50 cooled by the blade 26 and the heat-radiation fins 53 to promote heat exchange.

Specifically, since the stator frame 61 is connected to the motor housing 50 and the link 15 is connected to the stator frame 61, it is possible to promote heat exchange between the motor housing 50, the stator frame 61, the link 15, which are made of a metal material. As a result, it is possible to further improve the heat-dissipation performance of the motor housing 50 and further improve the effect of suppressing the increase in the temperature of the coil 62.

The rated torque of the motor is determined within a continuously operable temperature range.

In the robot wheel driving apparatus according to the embodiment of the present disclosure, it can be confirmed that since the characteristic configuration is provided, it is possible to improve the heat-dissipation performance of the motor 40 and increase the rated torque of the motor.

In particular, in the case of a miniaturized and lightweight motor, when a height of the motor is reduced, an input current needs to be increased to output the same torque. Therefore, a copper loss increases and a coil saturation temperature becomes higher.

When the heat-dissipation performance of the motor is improved according to the embodiment of the present disclosure, it is possible to reduce the size of the motor, thereby reducing the manufacturing cost of the motor compared to the conventional motor structure. In addition, since the heat-dissipation performance of the motor is greatly improved, it is possible to increase the structural reliability according to the increase in the temperature.

It was confirmed that when the outside air temperature of the wheel cover was 28° C., as a result of analyzing the increase in the temperature of the coil under a condition of a set rated output (0.8 Nm@50 rpm), it was confirmed that the coil saturation temperature was 120.7° C. in the conventional comparative example, and the coil saturation temperature was 101.8° C. in the embodiment of the present disclosure. That is, in the embodiment of the present disclosure, it could be confirmed that the temperature was reduced as much as 18.9° C. compared to the conventional comparative example.

In addition, in the conventional comparative example, in the inverter-integrated motor sealed by the wheel cover and the wheel, the inflow of outside air into the wheel cover was blocked to steadily increase the internal temperature. Therefore, in the conventional comparative example, it could be confirmed that a time until the temperature was saturated was delayed by about 50 minutes compared to the embodiment of the present disclosure.

According to an embodiment of the present disclosure, it is possible to improve heat-dissipation performance of a motor in a robot wheel driving apparatus having a structure in which a motor embedded in a wheel is sealed from the outside by the wheel and a wheel cover. In particular, according to the embodiment of the present disclosure, it is possible to suppress an increase in a temperature of a coil and increase a rated torque of the motor.

In addition, according to the embodiment of the present disclosure, it is possible to seek miniaturization and lightweight of an inverter-integrated motor and enable the circulation of outside air toward the inverter-integrated motor of which an entire surface is sealed by the wheel and the wheel cover, thereby suppressing the increase in the temperature of the coil.

In addition, according to the embodiment of the present disclosure, it is possible to allow outside air introduced through a wheel cover hole to flow into a motor housing through a wheel hole and allow the air to flow within an air gap between the wheel and the motor housing by rotation of a blade formed on the wheel. Therefore, it is possible to achieve the miniaturization and light-weight of the motor and suppress the increase in the temperature of the coil.

In addition, according to the embodiment of the present disclosure, it is possible to increase a heat-radiation surface area using heat-radiation fins of the motor housing facing the blade formed on the wheel and protruding toward the wheel. In addition, it is possible to promote heat exchange by arranging the motor housing, a stator frame, and a link to be connected in contact with one another, thereby suppressing the increase in the temperature of the coil.

Specific effects together with the above-described effects are described with a description of the following detailed matters for carrying out the disclosure.

Although the present disclosure has been described above with reference to the exemplary drawings, the present disclosure is not limited by the embodiments and drawings disclosed in the specification, and it is apparent that various modifications can be made by those skilled in the art within the scope of the technical spirit of the present disclosure. In addition, even when the operational effects according to the configuration of the present disclosure have not been explicitly described in the description of the embodiments of the present disclosure, it goes without saying that the effects predictable by the corresponding configuration should also be recognized.

What is claimed is:

1. A wheel driving apparatus comprising:
   a wheel;
   a tire coupled to the wheel;
   a wheel cover that covers and is coupled to sides of the wheel;
   a motor housing disposed in the wheel; and
   a motor disposed in the motor housing and configured to provide a rotating force to the wheel,
   wherein the wheel cover defines wheel cover holes that are configured to provide air from an outside of the wheel cover toward the wheel,
   wherein the wheel defines a wheel hole configured to provide the air provided through the wheel cover holes toward the motor housing, and
   wherein the wheel comprises a blade that protrudes from an inside of the wheel toward the motor housing and is configured to generate air flow between the wheel and the motor housing based on rotation of the wheel.

2. The wheel driving apparatus of claim 1, wherein the wheel cover comprises:
   a first wheel cover portion that covers and is coupled to a first side of the wheel among the sides of the wheel; and
   a second wheel cover portion that covers a second side of the wheel opposite to the first side of the wheel, the second wheel cover being coupled to and facing the first wheel cover portion, wherein the wheel is disposed between the first wheel cover and the second wheel cover, and
   wherein the wheel cover holes are defined through the first wheel cover portion and the second wheel cover portion and are symmetrical to each other.

3. The wheel driving apparatus of claim 1, wherein the wheel cover comprises:
   a first wheel cover portion that covers and is coupled to a first side of the wheel among the sides of the wheel;
   a second wheel cover portion that covers a second side of the wheel opposite to the first side of the wheel, the second wheel cover being coupled to and facing the first wheel cover portion, wherein the wheel is disposed between the first wheel cover and the second wheel cover; and
   a leg connector connected to the first wheel cover portion and the second wheel cover portion, the leg connector being configured to connect the wheel cover to an object,
   wherein the first wheel cover portion comprises:
      a first cover body that faces the first side of the wheel, the first cover body having a convex shape that defines an internal space between the first side of the wheel and the first cover body, and
      a first connector that extends from an end of the first cover body to the leg connector in a height direction and connects the first cover body to the leg connector, and
   wherein the wheel cover holes are defined in the first cover body and arranged radially with respect to a center of the motor.

4. The wheel driving apparatus of claim 3, wherein the wheel cover holes comprise:
   a plurality of first wheel cover holes defined in the first cover body and spaced apart from one another along a first circumference having a first radius with respect to the center of the motor;
   a plurality of second wheel cover holes defined in the first cover body and spaced apart from one another along a second circumference having a second radius greater than the first radius with respect to the center of the motor; and
   a plurality of third wheel cover holes defined in the first cover body and spaced apart from one another along a third circumference having a third radius greater than the second radius with respect to the center of the motor.

5. The wheel driving apparatus of claim 1, wherein the wheel cover comprises:
   a first wheel cover portion that covers and is coupled to a first side of the wheel among the sides of the wheel;
   a second wheel cover portion that covers a second side of the wheel opposite to the first side of the wheel, the second wheel cover being coupled to and facing the first wheel cover portion, wherein the wheel is disposed between the first wheel cover and the second wheel cover; and
   a leg connector connected to the first wheel cover portion and the second wheel cover portion, the leg connector being configured to connect the wheel cover to an object,
   wherein the second wheel cover portion comprises:
      a second cover body that faces the second side of the wheel, the second cover body having a convex shape that defines an internal space between the second side of the wheel and the second cover body, and
      a second connector that extends from an end of the second cover body to the leg connector in a height direction and connects the second cover body to the leg connector, and
   wherein the wheel cover holes are defined in the second cover body and arranged radially with respect to a center of the motor.

6. The wheel driving apparatus of claim 5, wherein the wheel cover holes comprise:

a plurality of first wheel cover holes defined in the second cover body and spaced apart from one another along a first circumference having a first radius with respect to the center of the motor;
a plurality of second wheel cover holes defined in the second cover body and spaced apart from one another along a second circumference having a second radius greater than the first radius with respect to the center of the motor; and
a plurality of third wheel cover holes defined in the second cover body and spaced apart from one another along a third circumference having a third radius greater than the second radius with respect to the center of the motor.

7. The wheel driving apparatus of claim 1, wherein the wheel comprises:
a first wheel body portion having a disk shape; and
a second wheel body portion having a circular tube shape that protrudes from and extends along an edge of the first wheel body portion,
wherein the tire is disposed at an outer circumferential surface of the second wheel body portion, and
wherein the wheel hole is defined in the first wheel body portion.

8. The wheel driving apparatus of claim 7, wherein the wheel hole is defined at a middle point between a center of the motor and the tire in a radial direction.

9. The wheel driving apparatus of claim 7, wherein the wheel hole is one of a plurality of wheel holes that are defined at the first wheel body portion and spaced apart from one another along a circumference having a set radius with respect to a center of the motor, and
wherein each of the plurality of wheel holes is a circular hole having a same diameter.

10. The wheel driving apparatus of claim 1, wherein the wheel comprises:
a first wheel body portion having a disk shape; and
a second wheel body portion having a circular tube shape that protrudes from and extends along an edge of the first wheel body portion,
wherein the tire is disposed at an outer circumferential surface of the second wheel body portion, and
wherein the blade is disposed at an inner circumferential surface of the second wheel body portion.

11. The wheel driving apparatus of claim 10, wherein the blade is one of a plurality of blades that are disposed at the inner circumferential surface of the second wheel body portion and spaced apart from one another in a circumferential direction along the inner circumferential surface of the second wheel body portion,
wherein each of the plurality of blades protrudes from the inner circumferential surface of the second wheel body portion in a radial direction of the motor, and
wherein a protrusion length of each of the plurality of blades is less than a distance between the second wheel body portion and the motor housing.

12. The wheel driving apparatus of claim 1, wherein the wheel comprises:
a first wheel body portion having a disk shape; and
a second wheel body portion having a circular tube shape that protrudes from and extends along an edge of the first wheel body portion,
wherein the tire is disposed at an outer circumferential surface of the second wheel body portion, and
wherein the blade is disposed at an inner circumferential surface of the second wheel body portion,
wherein the motor housing comprises:
a first motor housing portion that has a disk shape and faces the first wheel body portion,
a second motor housing portion that has a circular tube shape and faces the second wheel body portion, wherein an air gap is defined between the first motor housing portion and the second motor housing portion, and
a heat-radiation fin that is disposed at an outer circumferential surface of the second motor housing portion and defines a heat-radiation surface area of the second motor housing portion.

13. The wheel driving apparatus of claim 12, wherein the blade and the heat-radiation fin are spaced apart from each other by a gap having a set size.

14. The wheel driving apparatus of claim 12, wherein the blade is one of a plurality of blades that are disposed at the inner circumferential surface of the second wheel body portion and spaced apart from one another in a circumferential direction along the inner circumferential surface of the second wheel body portion,
wherein each of the plurality of blades protrudes from the inner circumferential surface of the second wheel body portion in a radial direction of the motor, and
wherein the heat-radiation fin is one of a plurality of heat-radiation fins that are disposed at the outer circumferential surface of the second motor housing portion and spaced apart from one another in the circumferential direction along the outer circumferential surface of the second motor housing portion,
wherein each of the plurality of heat-radiation fins protrudes from the outer circumferential surface of the second motor housing portion toward one of the plurality of blades, and
wherein a protrusion length of each of the plurality of blades is equal to a protrusion length of each of the plurality of heat-radiation fins.

15. The wheel driving apparatus of claim 1, further comprising a link that is disposed in the wheel cover and connects the motor to the wheel cover, the link being configured to restrict movement of the motor in the motor housing,
wherein the link has a first end fixed to the wheel cover and a second end fixed to the motor.

16. The wheel driving apparatus of claim 1, further comprising a lower cover coupled to a lower portion of the wheel cover and configured to cover a portion between the tire and the wheel cover based on the wheel and the wheel cover being connected to each other.

17. The wheel driving apparatus of claim 1, wherein the tire defines a fastening groove,
wherein the wheel comprises a fastening protrusion inserted into the fastening groove, and
wherein the fastening protrusion comprises:
a first fastening protrusion that has a band shape surrounding the wheel in a circumferential direction, and
a plurality of second fastening protrusions that protrude in a direction intersecting the first fastening protrusion and are spaced apart from one another by a predetermined distance.

18. A wheel driving apparatus comprising:
a wheel;
a tire coupled to the wheel;
a wheel cover that covers and is coupled to sides of the wheel;

a motor housing disposed inside the wheel, the motor housing having a cylindrical shape with one open surface;

a motor disposed in the motor housing and configured to provide a rotating force to the wheel;

an inverter cover connected to the motor; and a printed circuit board (PCB) that is disposed inside the inverter cover and faces the motor, wherein the motor comprises:
- a stator fixed to an inner side of the motor housing, and
- a rotor disposed outside the stator and configured to rotate relative to the stator, wherein an air gap is defined between the stator and the rotor, wherein the wheel cover defines a wheel cover hole configured to provide air from an outside of the wheel cover toward the wheel, and wherein the wheel defines a wheel hole configured to provide the air provided through the wheel cover hole toward the motor housing.

19. The wheel driving apparatus of claim 18, wherein the stator comprises:
- a stator core; and
- a plurality of coils wound around the stator core and arranged in a circumferential direction, wherein the rotor comprises:
- a plurality of magnets that face the plurality of coils and are arranged in the circumferential direction, and
- a rotor frame coupled to the plurality of magnets, the rotor frame being connected to the wheel and configured to rotate in the motor housing, wherein the rotor frame comprises:
- a rotational shaft that extends in an axial direction of the motor,
- a first rotor frame portion that has a disk shape and is connected to the rotational shaft, and
- a second rotor frame portion that has circular tube-shape protruding from an edge of the first rotor frame portion, wherein the rotational shaft comprises:
- a first bearing and a second bearing that support the rotational shaft,
- a first rotational shaft portion supported by the first bearing, the first rotational shaft portion having a first end and a second end that are spaced apart from each other in the axial direction, and
- a second rotational shaft portion connected to the second end of the first rotational shaft portion and supported by the second bearing, the second rotational shaft portion having a greater diameter than the first rotational shaft portion, and wherein the first rotor frame portion comprises:
- an outer frame that has a disk shape and is spaced apart from a center of the motor in a radial direction of the rotor,
- an inner frame that has a disk shape and is disposed closer to the center of the motor in the radial direction than the outer frame, wherein axial positions of to the inner frame and the outer frame are spaced apart from each other in the axial direction, and
- an inclined frame that connects the outer frame to the inner frame.

20. The wheel driving apparatus of claim 18, further comprising:
- a blade that is disposed in the wheel and protrudes toward the motor housing, the blade being configured to generate air flow between the wheel and the motor housing based on rotation of the wheel; and
- a heat-radiation fin that is disposed in the motor housing and extends in a direction facing the blade, the heat-radiation fin defining a heat-radiation surface area of the motor housing, wherein the stator comprises a stator frame that supports the stator, the stator frame having (i) a first surface that covers and is coupled to the one open surface of the motor housing and (ii) a second surface that covers and is coupled to the inverter cover, wherein the PCB is fixed to the stator frame and positioned inside the inverter cover, wherein the wheel driving apparatus further comprises a link that is disposed in the wheel cover and connects the motor to the wheel cover, the link being configured to restrict movement of the motor in the motor housing, wherein the link comprises:
- a straight link portion that defines a first end of the link and is coupled to the wheel cover, and
- a circular link portion that defines a second end of the link and is coupled to the stator frame and in contact with an edge of the stator frame, and wherein the inverter cover is disposed in the circular link portion.

* * * * *